United States Patent
Ohmori et al.

(10) Patent No.: US 12,479,050 B2
(45) Date of Patent: Nov. 25, 2025

(54) LASER IRRADIATION APPARATUS, INFORMATION PROCESSING METHOD, AND RECORDING MEDIUM RECORDING PROGRAM TO BE READABLE

(71) Applicant: JSW Aktina System Co., Ltd., Yokohama (JP)

(72) Inventors: Kenichi Ohmori, Yokohama (JP); Yuzaburo Ohta, Yokohama (JP); Rei Matsushita, Yokohama (JP)

(73) Assignee: JSW Aktina System Co., Ltd., Yokohama (JP)

( * ) Notice: Subject to any disclaimer, the term of this patent is extended or adjusted under 35 U.S.C. 154(b) by 308 days.

(21) Appl. No.: 17/749,445

(22) Filed: May 20, 2022

(65) Prior Publication Data
US 2023/0001518 A1   Jan. 5, 2023

(30) Foreign Application Priority Data
Jun. 30, 2021   (JP) .................. 2021-109202

(51) Int. Cl.
*B23K 26/70*   (2014.01)
*B23K 31/00*   (2006.01)

(52) U.S. Cl.
CPC .......... *B23K 26/705* (2015.10); *B23K 26/707* (2015.10); *B23K 31/006* (2013.01)

(58) Field of Classification Search
CPC .. B23K 26/705; B23K 26/707; B23K 26/351; B23K 26/352; B23K 26/70; B23K 31/006; G01M 11/00; H01L 21/02675; H01L 21/268
See application file for complete search history.

(56) References Cited

U.S. PATENT DOCUMENTS

| | | | |
|---|---|---|---|
| 5,261,793 A * | 11/1993 | Piltingsrud | ......... F04B 43/1253 417/205 |
| 6,008,101 A | 12/1999 | Tanaka et al. | |
| 11,188,065 B2 * | 11/2021 | Vedula | ................ G06F 18/2433 |

(Continued)

FOREIGN PATENT DOCUMENTS

| | | |
|---|---|---|
| JP | H5-190956 A | 7/1993 |
| JP | H6-66280 A | 3/1994 |

(Continued)

OTHER PUBLICATIONS

Merriam-Webster, "vibrate" definition, retrieved on Dec. 6, 2024, retrieved from <https://web.archive.org/web/20200923110200/https://www.merriam-webster.com/dictionary/vibrate> via Wayback Machine on Sep. 23, 2020, pp. 1-2 (Year: 2020).*

(Continued)

*Primary Examiner* — Nicholas Klicos
(74) *Attorney, Agent, or Firm* — Bret E. Field; Bozicevic, Field & Francis LLP

(57) ABSTRACT

A laser irradiation apparatus is a laser irradiation apparatus including a laser light source, the laser irradiation apparatus including a failure prediction unit configured to perform failure prediction on a movable part used when a substrate is processed by the laser light source, in which the failure prediction unit acquires a physical quantity when the movable part is movable, and derives a failure time of the movable part based on an acquired physical quantity.

9 Claims, 16 Drawing Sheets

(56) References Cited

U.S. PATENT DOCUMENTS

| | | | |
|---|---|---|---|
| 2004/0064277 A1* | 4/2004 | Samata | G05B 23/0283 |
| | | | 702/76 |
| 2008/0109185 A1* | 5/2008 | Cheung | G05B 23/0283 |
| | | | 702/184 |
| 2008/0283779 A1* | 11/2008 | Tran | G03F 7/70908 |
| | | | 250/504 R |
| 2011/0008188 A1* | 1/2011 | Di Leo | F04B 45/033 |
| | | | 417/375 |
| 2012/0209569 A1* | 8/2012 | Becourt | F04D 19/04 |
| | | | 702/183 |
| 2013/0336814 A1* | 12/2013 | Kamen | A61M 5/16859 |
| | | | 417/302 |
| 2014/0201571 A1* | 7/2014 | Hosek | B25J 9/1674 |
| | | | 714/26 |
| 2015/0198017 A1* | 7/2015 | Wang | E21B 43/129 |
| | | | 137/565.11 |
| 2015/0292082 A1 | 10/2015 | Sano | |
| 2019/0377259 A1 | 12/2019 | Kimura | |
| 2020/0333718 A1 | 10/2020 | Takiguchi et al. | |

FOREIGN PATENT DOCUMENTS

| | | |
|---|---|---|
| JP | H8-227855 A | 9/1996 |
| JP | H10-135196 A | 5/1998 |
| JP | H11-199207 A | 7/1999 |
| JP | 2012-15545 A | 1/2012 |
| JP | 2015-209561 A | 11/2015 |
| TW | 202040644 A | 11/2020 |

OTHER PUBLICATIONS

Notice of Reasons for Refusal for Japanese Application No. 2021-109202 mailed Dec. 3, 2024, with its English translation, 5 pages.

Office Action for Japanese Application No. 2025-006423 mailed Aug. 26, 2025, with its English translation, 7 pages.

English Translation of Office Action for Taiwan Application No. 11420872790 mailed Aug. 19, 2025, 4 pages.

* cited by examiner

F I G . 2
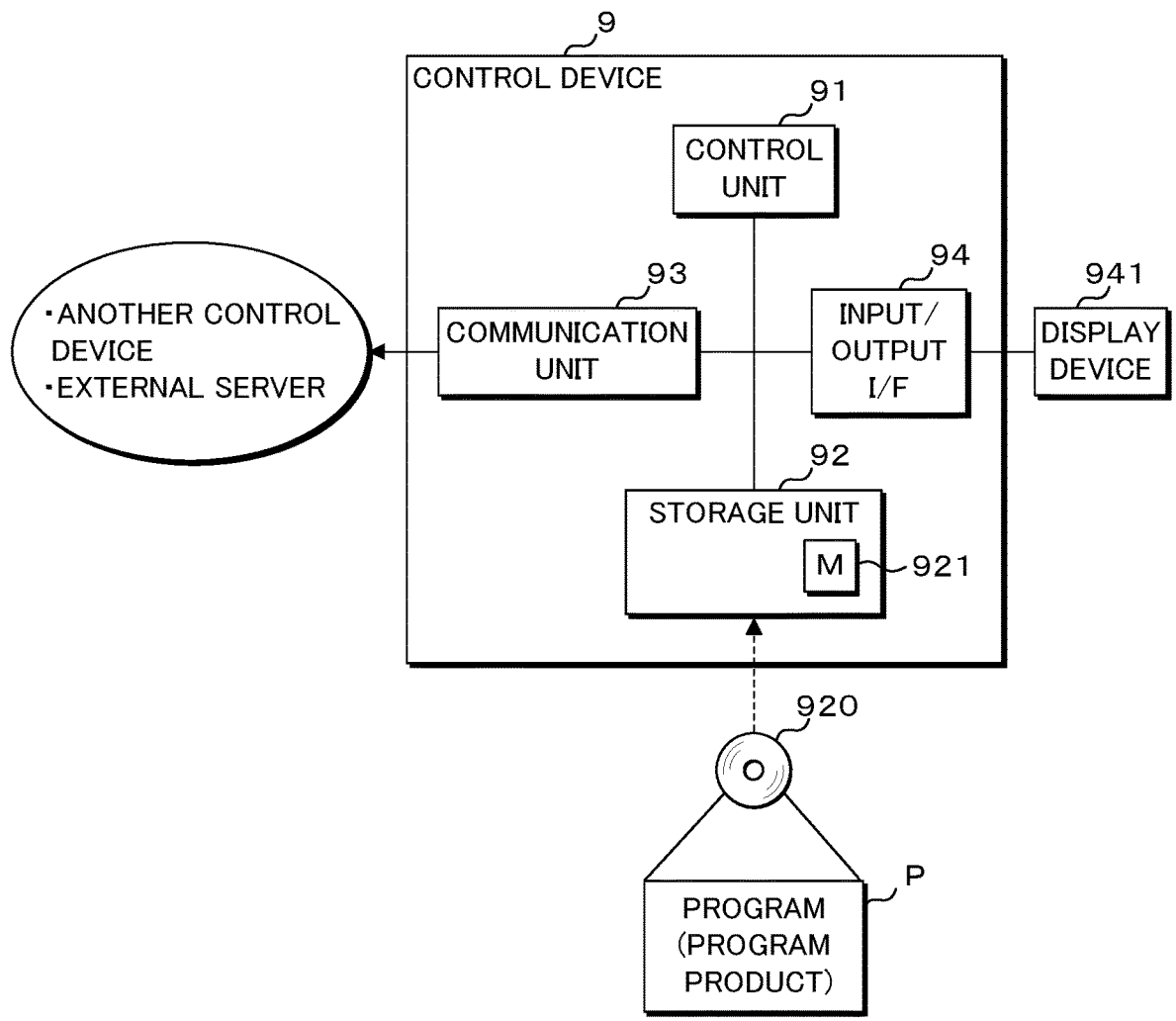

F I G . 12
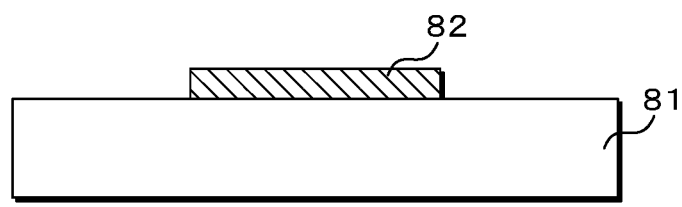

F I G . 1 3
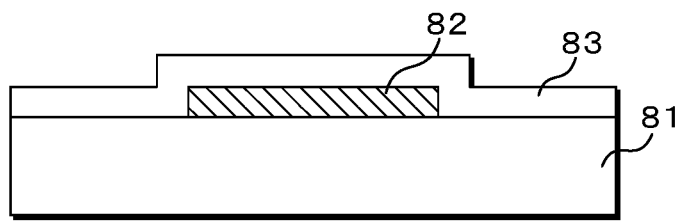

F I G . 14
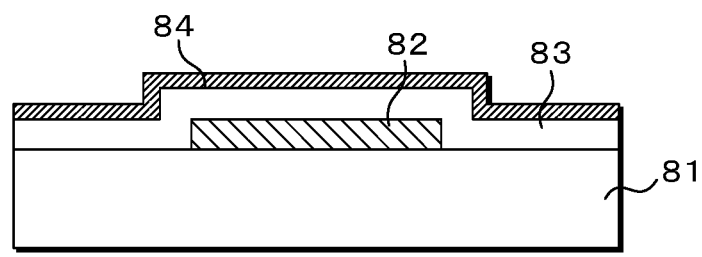

LASER IRRADIATION APPARATUS, INFORMATION PROCESSING METHOD, AND RECORDING MEDIUM RECORDING PROGRAM TO BE READABLE

CROSS-REFERENCE TO RELATED APPLICATION

This Non-provisional application claims priority under 35 U.S.C § 119(a) on Patent Application No. 2021-109202 filed in Japan on Jun. 30, 2021, the entire contents of which are hereby incorporated by reference.

FIELD

The present disclosure relates to a laser irradiation apparatus, an information processing method, and a recording medium recording a program to be readable.

BACKGROUND

A laser annealing apparatus for forming a polycrystalline silicon thin film has been known (for example, Japanese Patent Application Laid-Open No. 2012-15545).

The laser annealing apparatus described in Japanese Patent Application Laid-Open No. 2012-15545 includes a waveform shaping device that shapes a waveform of a laser light pulse, and a polycrystalline silicon thin film is formed by irradiating an amorphous silicon film with laser light formed in a line shape by the waveform shaping device.

However, in the laser annealing apparatus of Japanese Patent Application Laid-Open No. 2012-15545, a point regarding failure prediction of various parts included in the laser annealing apparatus is not taken into consideration.

SUMMARY

The disclosure has been made in view of such circumstances, and an object of the disclosure is to provide a laser irradiation apparatus, etc. capable of efficiently predicting failure of a part included in the laser irradiation apparatus.

A laser irradiation apparatus according to this aspect is a laser irradiation apparatus including a laser light source, the laser irradiation apparatus including a failure prediction unit configured to perform failure prediction on a movable part used when a substrate is processed by the laser light source, in which the failure prediction unit acquires a physical quantity when the movable part is movable, and derives a failure time of the movable part based on an acquired physical quantity.

An information processing method according to this aspect is an information processing method of causing a computer configured to perform failure prediction on a movable part used when a substrate is processed by a laser light source included in a laser irradiation apparatus to execute processes of (A) acquiring a physical quantity when the movable part is movable, and (B) deriving a failure time of the movable part based on an acquired physical quantity.

A program according to this aspect is a program causing a computer configured to perform failure prediction on a movable part used when a substrate is processed by a laser light source included in a laser irradiation apparatus to execute processes of (A) acquiring a physical quantity when the movable part is movable, and (B) deriving a failure time of the movable part based on an acquired physical quantity.

According to the disclosure, it is possible to provide a laser irradiation apparatus, etc. that efficiently predicts a failure of a component included in the laser irradiation apparatus.

BRIEF DESCRIPTION OF SEVERAL VIEWS OF DRAWINGS

FIG. 2 is a diagram illustrating a configuration example of a control device included in the laser annealing apparatus;

FIG. 12 is a process sectional view illustrating a method of manufacturing a semiconductor device according to another embodiment (method of manufacturing a semiconductor device);

FIG. 13 is a process sectional view illustrating the method of manufacturing the semiconductor device according to another embodiment (method of manufacturing the semiconductor device);

FIG. 14 is a process sectional view illustrating the method of manufacturing the semiconductor device according to another embodiment (method of manufacturing the semiconductor device);

DETAILED DESCRIPTION

First Embodiment

Figure 1:
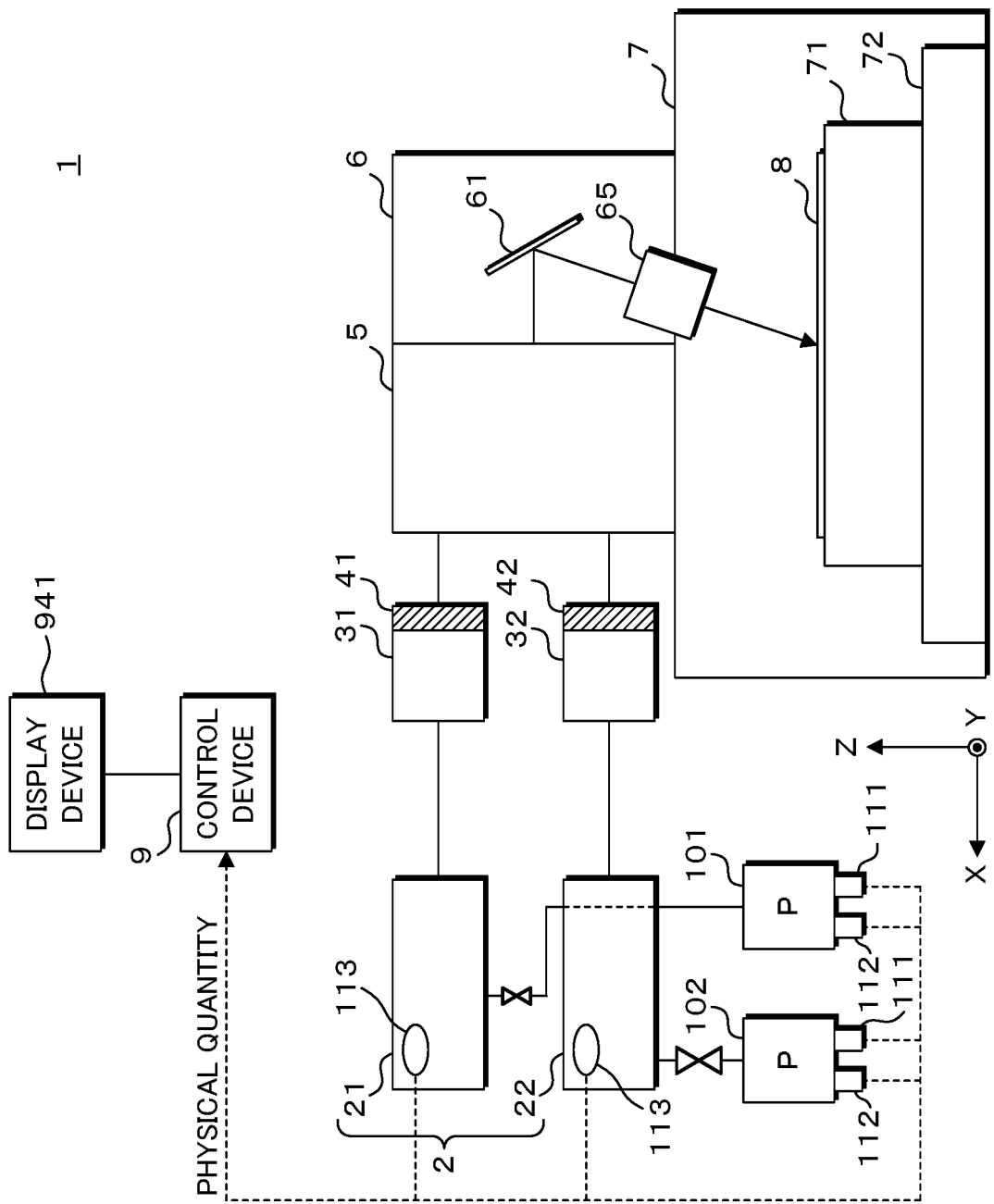
FIG. 1 is a diagram illustrating a configuration example of a laser annealing apparatus according to a first embodiment.

Hereinafter, embodiments of the disclosure will be described. FIG. 1 is a diagram illustrating a configuration example of a laser annealing apparatus 1 according to a first embodiment. FIG. 2 is a diagram illustrating a configuration example of a control device 9 included in the laser annealing apparatus 1. The laser annealing apparatus 1 (laser irradiation apparatus) is, for example, an excimer laser annealing (ELA) apparatus for forming a low temperature poly-silicon (LTPS) film.

The laser annealing apparatus 1 irradiates a silicon film formed on a substrate 8 with laser light. In this way, it is possible to convert an amorphous silicon film (a-Si film) into a polycrystalline silicon film (polysilicon film: p-Si film). For example, the substrate 8 is a transparent substrate such as a glass substrate.

As illustrated in the figure of the present embodiment, in a XYZ three-dimensional Cartesian coordinate system, a Z-direction is a vertical direction and is a direction perpendicular to the substrate 8. An XY-plane is a plane parallel to a plane on which the silicon film of the substrate 8 is formed. For example, an X-direction is a longitudinal direction of the rectangular substrate 8, and a Y-direction is a lateral direction of the substrate 8. When using a Θ-axis stage 71 that can rotate from 0° to 90° about a Z-axis, the X-direction can be the lateral direction of the substrate 8 and the Y direction can be the longitudinal direction of the substrate 8.

The laser annealing apparatus 1 includes an annealing optical system 11, a laser irradiation chamber 7, and a control device 9. The laser irradiation chamber 7 accommodates a base 72 and a stage 71 disposed on the base 72. In the laser annealing apparatus 1, a silicon film 201 is irradiated with laser light while the substrate 8 is conveyed in a +X-direction by the stage 71.

The annealing optical system 11 is an optical system for generating laser light for crystallizing an amorphous silicon film formed on the substrate 8 and converting the amorphous silicon film into a polysilicon film, and irradiating the amorphous silicon film with the laser light. The annealing optical system 11 is an optical system including a laser light source 2 including a first laser light source 21 and a second laser light source 22, a first attenuator 31, a second attenuator 32, a synthetic optical system 5, a beam shaping optical system 6, an epi-illumination mirror 61, and a projection lens 65 and emitting laser light obtained by synthesizing a plurality of laser light rays.

The laser light source 2 includes the first laser light source 21 and the second laser light source 22, and includes a plurality of laser light sources 2. In the present embodiment, a two-laser light source configuration of the first laser light source 21 and the second laser light source 22 is adopted. However, this configuration is an example, and the disclosure is not limited to the two-laser light source configuration. The laser light source 2 may include a single laser light source 2 or three or more laser light sources 2.

The first laser light source 21 and the second laser light source 22 are laser generators that generate pulsed laser light as laser light for irradiating the amorphous silicon film (processed object). The generated laser light is laser light for crystallizing a non-crystalline film on the substrate 8 to form a crystallized film, and is, for example, gas laser light such as excimer laser light having a center wavelength of 308 nm.

In the first laser light source 21 and the second laser light source 22, a gas such as xenon is enclosed in a chamber, and two resonator mirrors are disposed to face each other with the gas interposed therebetween. One resonator mirror is a total reflection mirror that reflects all light, and the other resonator mirror is a partial reflection mirror that transmits a part of light. Gas light excited by the gas is repeatedly reflected between the resonator mirrors, and amplified light is emitted from the resonator mirror as laser light. For example, the first laser light source 21 and the second laser light source 22 repeatedly emit pulsed laser light in a cycle of 500 Hz to 600 Hz. The first laser light source 21 emits the laser light toward the first attenuator 31. The second laser light source 22 emits the laser light toward the second attenuator 32.

The first attenuator 31 and the second attenuator 32 attenuate incident laser light to adjust an energy density to a predetermined energy density. As a characteristic, these attenuators have a transmittance indicating a ratio of the emitted laser light to the incident laser light, and the transmittance is configured to be variable based on a signal from the control device 9.

The first attenuator 31 is provided in the middle of an optical path from the first laser light source 21 to the synthetic optical system 5. The second attenuator 32 is provided in the middle of an optical path from the second laser light source 22 to the synthetic optical system 5. The first attenuator 31 attenuates laser light emitted by the first laser light source 21 according to the transmittance. The second attenuator 32 attenuates laser light emitted by the second laser light source 22 according to the transmittance.

A first polarization ratio control unit 41 and a second polarization ratio control unit 42 are disposed on emission sides of the first attenuator 31 and the second attenuator 32, respectively. The first polarization ratio control unit 41 and the second polarization ratio control unit 42 include, for example, a ½ wave plate (λ/2 plate) and a polarization beam splitter, and change a polarization ratio of a P-polarized wave and an S-polarized wave of incident laser light.

The first polarization ratio control unit 41 changes a polarization ratio of laser light emitted from the first attenuator 31. The second polarization ratio control unit 42 changes a polarization ratio of laser light emitted from the second attenuator 32. The first polarization ratio control unit 41 and the second polarization ratio control unit 42 are configured to change (vary) the respective polarization ratios based on a control signal output from the control device 9.

The synthetic optical system 5 has, for example, a beam splitter, etc., and synthesizes laser emitted from the first laser light source 21 and laser light emitted from the second laser light source 22. Since the first attenuator 31 and the second attenuator 32 are disposed in the optical path between the synthetic optical system 5 and the first laser light source 21 and the optical path between the synthetic optical system 5 and the second laser light source 22, laser emitted from the first attenuator 31 and laser light emitted from the second attenuator 32 are incident on the synthetic optical system 5, and the laser light is synthesized by the synthetic optical system 5.

In a plan view orthogonal to an optical axis, the laser light from the first laser light source 21 and the laser light from the second laser light source 22 overlap each other. By the synthetic optical system 5, the laser light from the first laser light source 21 and the laser light from the second laser light source 22 are spatially overlapped and coaxial, so that synthesized laser light is obtained. The laser light synthesized by the synthetic optical system 5 is incident on the beam shaping optical system 6.

The laser light synthesized by the synthetic optical system 5 is incident on the beam shaping optical system 6, and the beam shaping optical system 6 shapes the incident laser light (synthesized laser light) to generate beam-shaped laser beam suitable for irradiating the silicon film. The beam shaping optical system 6 generates a line-shaped line beam along the Y-direction.

The beam shaping optical system 6 divides one beam into a plurality of beams (a plurality of line beams arranged in the Z-direction) by, for example, a homogenizer including a lens array. After dividing into the plurality of beams, the beams may have a line beam shape by being synthesized using a condenser lens. The beam shaping optical system 6 emits the generated (shaped) line-shaped laser light to the epi-illumination mirror 61.

The epi-illumination mirror 61 is a rectangular reflection mirror extending in the −Y direction, and reflects laser light which is a plurality of line beams generated by the beam shaping optical system 6. The epi-illumination mirror 61 is, for example, a dichroic mirror, which is a partial reflection mirror that transmits a part of light. The epi-illumination mirror 61 reflects line-shaped laser light to generate reflected light, and at the same time, transmits a part of the line-shaped laser light to generate transmitted light. The epi-illumination mirror 61 irradiates the silicon film of the substrate 8 with laser light, which is reflected light, and emits laser light, which is transmitted light, to a pulse measuring instrument such as a biplanar phototube.

The projection lens 65 is disposed above the substrate. The projection lens 65 has a plurality of lenses for projecting laser light onto the substrate, that is, the silicon film. The projection lens 65 concentrates the laser light on the substrate. On the substrate 8, laser light forms a line-shaped irradiation region along the Y-direction. That is, on the substrate 8, laser light is a line beam whose longitudinal direction is the Y-direction. Further, the silicon film is irradiated with laser light while the substrate 8 is conveyed in the +X-direction. In this way, it is possible to irradiate a band-shaped region having a length of the irradiation region in the Y-direction as a width with laser light.

The line beam-shaped laser light emitted to the epi-illumination mirror 61 has a beam shape in which a short-axis width is widened, that is, after being emitted from the condenser lens, the short-axis width is slightly widened, and the line beam-shaped laser light has a collapsed shape. The laser light reflected by the epi-illumination mirror 61 passes through the projection lens 65 and is shaped into line beam-shaped laser light having a short-axis width of about ⅕.

The control device 9 is an information processing device such as a personal computer or a server device that controls or manages the laser annealing apparatus 1 as a whole or in an integrated manner. The control device 9 includes a control unit 91, a storage unit 92, a communication unit 93, and an input/output I/F 94, and is communicably connected a control device (another control device) that controls each optical system in the laser light source 2 or the annealing optical system 11 via the communication unit 93 or the input/output I/F 94. The control device 9 is communicably connected to various measuring devices such as a pulse measuring instrument and an optical detector included in the laser annealing apparatus 1, and performs various controls on the laser light source 2 or the annealing optical system 11 based on measurement data output from these various measuring devices.

The control unit 91 has an arithmetic processing unit having a timing function such as one or a plurality of CPUs (Central Processing Units), MPUs (Micro-Processing Units), and GPUs (Graphics Processing Units), and performs various information processing and control processing for each optical system included in the laser light source 2 or the annealing optical system 11 by reading and executing a program P (program product) stored in the storage unit 92.

The storage unit 92 includes a volatile storage area such as a SRAM (Static Random Access Memory), a DRAM (Dynamic Random Access Memory), or a flash memory, and a nonvolatile storage area such as an EEPROM or a hard disk. The storage unit 92 stores the program P (program product) and data to be referred to at the time of processing in advance. The program P stored in the storage unit 92 may be a program P (program product) read from a recording medium 920 readable by the control unit 91. Further, the program P (program product) may be downloaded from an external computer (not illustrated) connected to a communication network (not illustrated) and stored in the storage unit 92. The storage unit 92 stores an actual file of a learning model such as a learning model 921 for a vacuum pump, which will be described later. The actual file of the learning model may be configured as a module included in the program P (program product).

The communication unit 93 is, for example, a communication module or a communication interface conforming to an Ethernet (registered trademark) standard, and an Ethernet cable is connected to the communication unit 93. The communication unit 93 is not limited to the case where the Ethernet cable, etc. is wired, and may be, for example, a communication interface compatible with wireless communication such as a narrow-range wireless communication module such as Wi-Fi (registered trademark) or Bluetooth (registered trademark), or a wide-range wireless communication module such as 4G and 5G.

The input/output I/F 94 is a communication interface compliant with a communication standard such as RS232C or USB. An input device such as a keyboard or a display device 941 such as a liquid crystal display is connected to the input/output I/F 94.

Each chamber of the first laser light source 21 and the second laser light source 22 communicates with (is connected to) a vacuum pump (first vacuum pump 101 and second vacuum pump 102) via, for example, a gas pipe. That is, the first vacuum pump 101 is connected to the chamber of the first laser light source 21, and the second vacuum pump 102 is connected to the chamber of the second laser light source 22.

Gas such as xenon enclosed in the chambers of the first laser light source 21 and the second laser light source 22 deteriorates due to excitation when laser light is emitted, and regular replacement (all replacement) work is required according to a gas life. In performing the gas replacement, the first vacuum pump 101 and the second vacuum pump 102 suck (evacuate) gas in the chambers of the first laser light source 21 and the second laser light source 22 communicating with the first vacuum pump 101 and the second vacuum pump 102, respectively, and put the inside of these chambers in a vacuum state where a pressure is equal to or lower than a predetermined pressure.

Pressure sensors 113 are provided in the respective chambers of the first laser light source 21 and the second laser light source 22. Each of these pressure sensors 113 is communicably connected to the control device 9 by a communication line, etc., detect a pressure value in the chamber, and output the pressure value to the control device 9. Although the details will be described later, the control device 9 can acquire a point in time when the inside of the chamber reaches a vacuum state by the pressure value output by each pressure sensor 113 provided in each chamber of the first laser light source 21 and the second laser light source 22. The control device 9 acquires, as a vacuum reach time, an elapsed time from when suction (evacuation) of the gas in these chambers starts until when the vacuum state is reached.

A temperature sensor 111 and a vibration sensor 112 are provided to each of the first vacuum pump 101 and the second vacuum pump 102. The temperature sensor 111 and the vibration sensor 112 correspond to a detection unit that detects a physical quantity when a movable part such as the first vacuum pump 101 is movable. The temperature sensor 111 includes, for example, a thermistor, etc., and is provided on an outer shell of each of the first vacuum pump 101 and the second vacuum pump 102 to detect a surface temperature of the outer shell of each of the first vacuum pump 101 and the second vacuum pump 102. Similarly to the pressure sensor 113, the temperature sensor 111 is communicably connected to the control device 9 by a communication line, etc., and outputs a detected temperature to the control device 9.

The vibration sensor 112 includes, for example, a piezoelectric element, etc., and is provided on the outer shell of each of the first vacuum pump 101 and the second vacuum pump 102 to detect the number of vibrations of each of the first vacuum pump 101 and the second vacuum pump 102. Similarly to the pressure sensor 113, the vibration sensor 112 is communicably connected to the control device 9 by a communication line, etc., and outputs the detected number of vibrations to the control device 9.

The temperature sensor 111 and the vibration sensor 112 provided to each of the first vacuum pump 101 and the second vacuum pump 102 detect the temperature and the number of vibrations and output the detected temperature and number of vibrations to the control device 9 at a predetermined sampling cycle during a period during which evacuation is performed, that is, from when suction (evacuation) of gas in the chamber starts until when a vacuum state is reached. In this way, the control device 9 can acquire, as time-series data, the temperature and the number of vibrations of each of the first vacuum pump 101 and the second vacuum pump 102 during a period during which evacuation is performed, that is, a vacuum reach time.

The control device 9 associates the acquired vacuum reach time and the time-series data of the temperature and the number of vibrations during the vacuum reach time with time information such as a date and time when evacuation is performed, and stores the vacuum reach time and the time-series data associated with the time information in the storage unit 92 as, for example, movable history data in table format. The control device 9 may calculate an integrated operating time of each of the first vacuum pump 101 and the second vacuum pump 102 by summing up vacuum reach times of evacuation performed a plurality of times.

Figure 3:
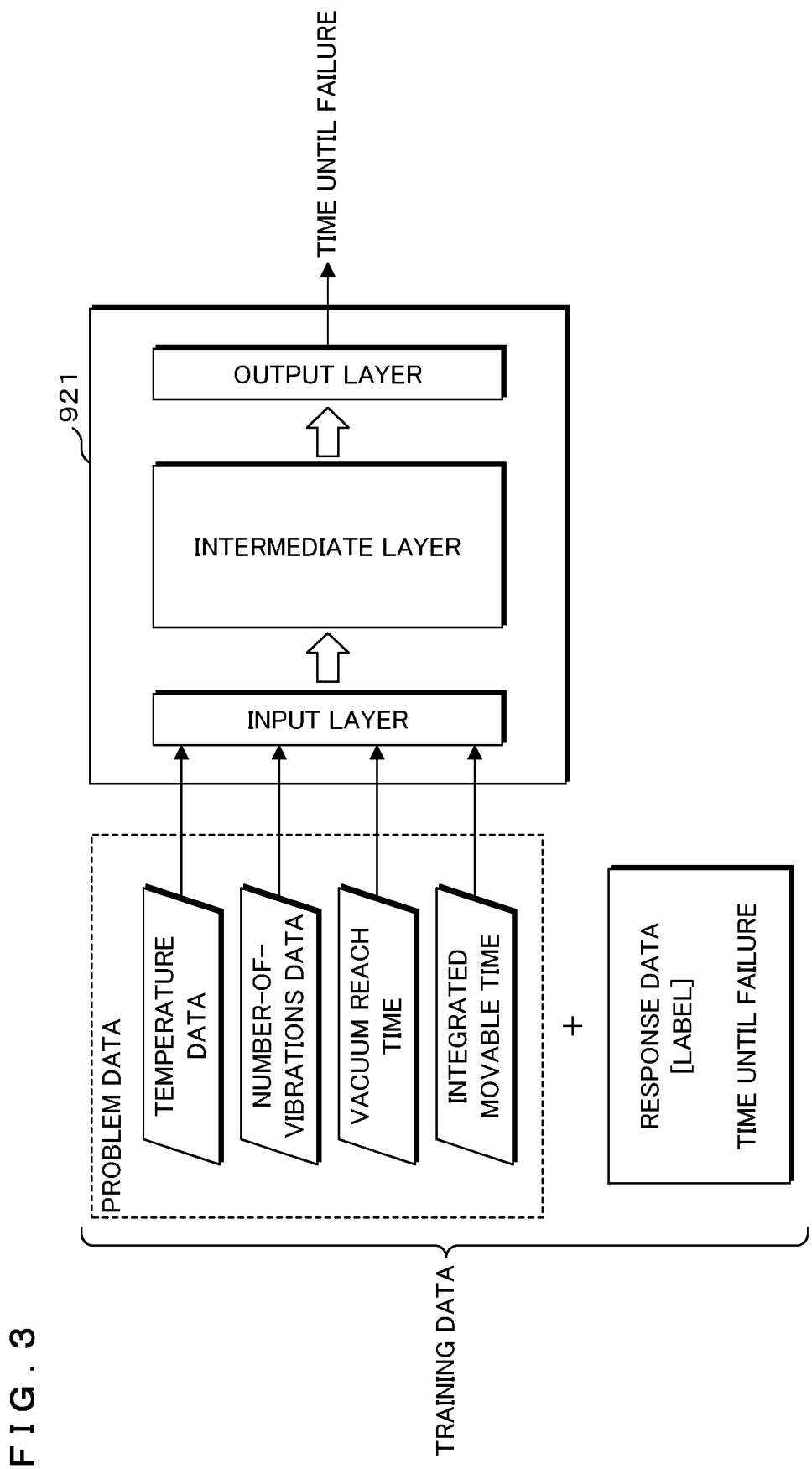
FIG. 3 is an explanatory diagram illustrating an example of a learning model for a vacuum pump.

FIG. 3 is an explanatory diagram illustrating an example of a learning model 921 for a vacuum pump. The control unit 91 of the control device 9 generates the learning model 921 for the vacuum pump in which a neural network is trained using training data, and in the case of inputting physical quantities such as vibration and temperature when the vacuum pump is movable, a vacuum reach time, and an integrated movable time of the vacuum pump up to a present time, a time until failure of the vacuum pump is output.

In the present embodiment, as described above, the vacuum pump includes two pumps of the first vacuum pump 101 and the second vacuum pump 102. However, in the following description, an example in which the first vacuum pump 101 is applied will be described. Naturally, the learning model 921 for the vacuum pump is a model that can be applied to both the first vacuum pump 101 and the second vacuum pump 102.

The training data includes problem data containing physical quantities such as vibration and temperature of the first vacuum pump 101, a vacuum reach time, and an integrated movable time, and response data containing a time until failure of the first vacuum pump 101, and is stored in the storage unit 92 of the control device 9. Original data of the training data can be generated, for example, by aggregating actual data of gas replacement performed by a plurality of laser annealing apparatuses 1.

The neural network trained using the training data (the learning model 921 for the vacuum pump) is expected to be used as a program module that is a part of artificial intelligence software. The learning model 921 for the vacuum pump is used in the control device 9, and executed by the control device 9 having an arithmetic processing capacity in this way, thereby constructing a neural network system.

The learning model 921 for the vacuum pump includes a deep neural network (DNN), and has an input layer for receiving an input of physical quantities such as vibration and temperature of the first vacuum pump 101, a vacuum reach time, and an integrated movable time, an intermediate layer for extracting feature amounts such as the physical quantities, and an output layer for outputting a time until failure of the first vacuum pump 101.

The input layer has a plurality of neurons for receiving the input of the physical quantities such as the vibration (number-of-vibrations data) and the temperature (temperature data), the vacuum reach time, and the integrated movable time, and passes input values to the intermediate layer. The intermediate layer is defined using an activation function such as a ReLu function or a sigmoid function, has a plurality of neurons for extracting feature amounts of the respective input values, and passes the extracted feature amounts to the output layer. Parameters such as a weighting coefficient and a bias value of the activation function are optimized using a back propagation method. The output layer includes, for example, a fully connected layer, and outputs the time until failure based on the feature amounts output from the intermediate layer.

The number-of-vibrations data and the temperature data input to the learning model 921 for the vacuum pump may be data in array format or matrix format containing a plurality of temperatures and numbers of vibrations acquired in time series from the temperature sensor 111 and the vibration sensor 112 during a period (evacuation period) from an operation start of the first vacuum pump 101 to a vacuum state. Alternatively, the number-of-vibrations data input to the learning model 921 for the vacuum pump may be an average value (average number of vibrations) or a maximum value (maximum number of vibrations) of a plurality of numbers of vibrations acquired during the evacuation period. Similarly, the temperature data input to the learning model 921 for the vacuum pump may be an average value (average temperature) or a maximum value (maximum temperature) of a plurality of temperatures acquired during the evacuation period.

The training data may include not only data when the first vacuum pump 101 is normal but also data when the first vacuum pump 101 fails. The problem data included as data at the time of failure includes at least one of the physical quantities such as vibration and temperature when the first vacuum pump 101 fails, the vacuum reach time, and the integrated movable time, and a time until failure, which is response data, indicates 0. The training data may include, for example, data of the first vacuum pump 101 at the time of first evacuation immediately after replacement with a new one. When the physical quantities such as the temperature and the number of vibrations detected in the first evacuation are used as problem data, response data (time until failure) labeled as the problem data may be, for example, a guaranteed movable time specified in product specifications of the first vacuum pump 101.

In this way, by including data at the time of failure (vibration, temperature, vacuum reach time, etc.) labeled with 0 as a time until failure in the training data and training the learning model 921 for the vacuum pump, failure determination of the first vacuum pump 101 can be performed using the learning model 921 for the vacuum pump. That is, when the learning model 921 for the vacuum pump outputs 0 as the time until failure, it can be determined that the first vacuum pump 101 fails.

In the present embodiment, the data input to the learning model 921 for the vacuum pump is set to the physical quantities such as the vibration (number-of-vibrations data) and the temperature (temperature data), the vacuum reach time, and the integrated movable time. However, the disclosure is not limited thereto. The data input to the learning model 921 for the vacuum pump may be any one piece of data of the vibration (number-of-vibrations data), the temperature (temperature data), the vacuum reach time, and the integrated movable time, or an arbitrary combination of the data.

In the present embodiment, the learning model 921 for the vacuum pump is set to the DNN. However, the disclosure is not limited thereto, and it is possible to adopt a learning model constructed by another learning algorithm such as a neural network other than the DNN, a transformer, a recurrent neural network (RNN), a long-short term model (LSTM), a CNN, a support vector machine (SVM), a Bayesian network, a linear regression, a regression tree, a multiple regression, a random forest, or an ensemble.

As an example of using other than the DNN, the control unit 91 of the control device 9 may derive a failure prediction line by performing, for example, regression analysis based on a physical quantity acquired this time and a plurality of physical quantities in the past. In this case, the failure prediction line corresponds to the learning model 921 for the vacuum pump generated by machine learning.

For example, when the failure prediction line is derived by a straight line (linear approximation), the control unit 91 of the control device 9 may use the least squares method based on a physical quantity acquired this time and a plurality of physical quantities in the past. Alternatively, the control unit 91 may derive a failure prediction line using various methods such as a logarithmic approximation curve, a polynomial approximation curve, a power approximation curve, or an exponential approximation curve. When the failure prediction line is graphed, a horizontal axis indicates an elapsed time, and a vertical axis may indicate a physical quantity or a feature amount extracted by performing, for example, principal component analysis or dimensional compression on the physical quantity.

The control unit 91 of the control device 9 sets a failure threshold at which failure of the first vacuum pump 101, which is a movable part, is assumed within a range of the physical quantity (feature amount) defined in the derived failure prediction line. That is, when the acquired physical quantity of the first vacuum pump 101 (movable part) reaches the failure threshold, the control unit 91 of the control device 9 may predict that the first vacuum pump 101 will fail and calculate a period from a present time until failure threshold is reached as the time until failure.

The control unit 91 of the control device 9 functions as a failure prediction unit for predicting (deriving) a time until failure of the first vacuum pump 101 based on the physical quantities such as the vibration and the temperature of the first vacuum pump 101 when evacuation is performed, the vacuum reach time, and the integrated movable time by using the learning model 921 for the vacuum pump stored in the storage unit 92. The control unit 91 of the control device 9 functioning as the failure prediction unit derives an expected failure time by adding the derived time until failure, a planned outage period, etc. to a current data and time, and outputs (transmits) the derived failure time to a mobile terminal such as an administrator of the laser annealing apparatus 1 via, for example, the display device 941 or the communication unit 93.

It is assumed that the control device 9 included in the laser annealing apparatus 1 generates the learning model 921 for the vacuum pump. However, the disclosure is not limited thereto. The learning model 921 for the vacuum pump may be trained and generated by an external server deice such as a cloud server other than the control device 9. It is assumed that the learning model 921 for the vacuum pump is used in the control device 9. However, the disclosure is not limited thereto. The control device 9 may communicate with, for example, the cloud server connected to the Internet via the communication unit 93, and acquire the time until failure output by the learning model 921 for the vacuum pump mounted on the cloud server.

Figure 4:
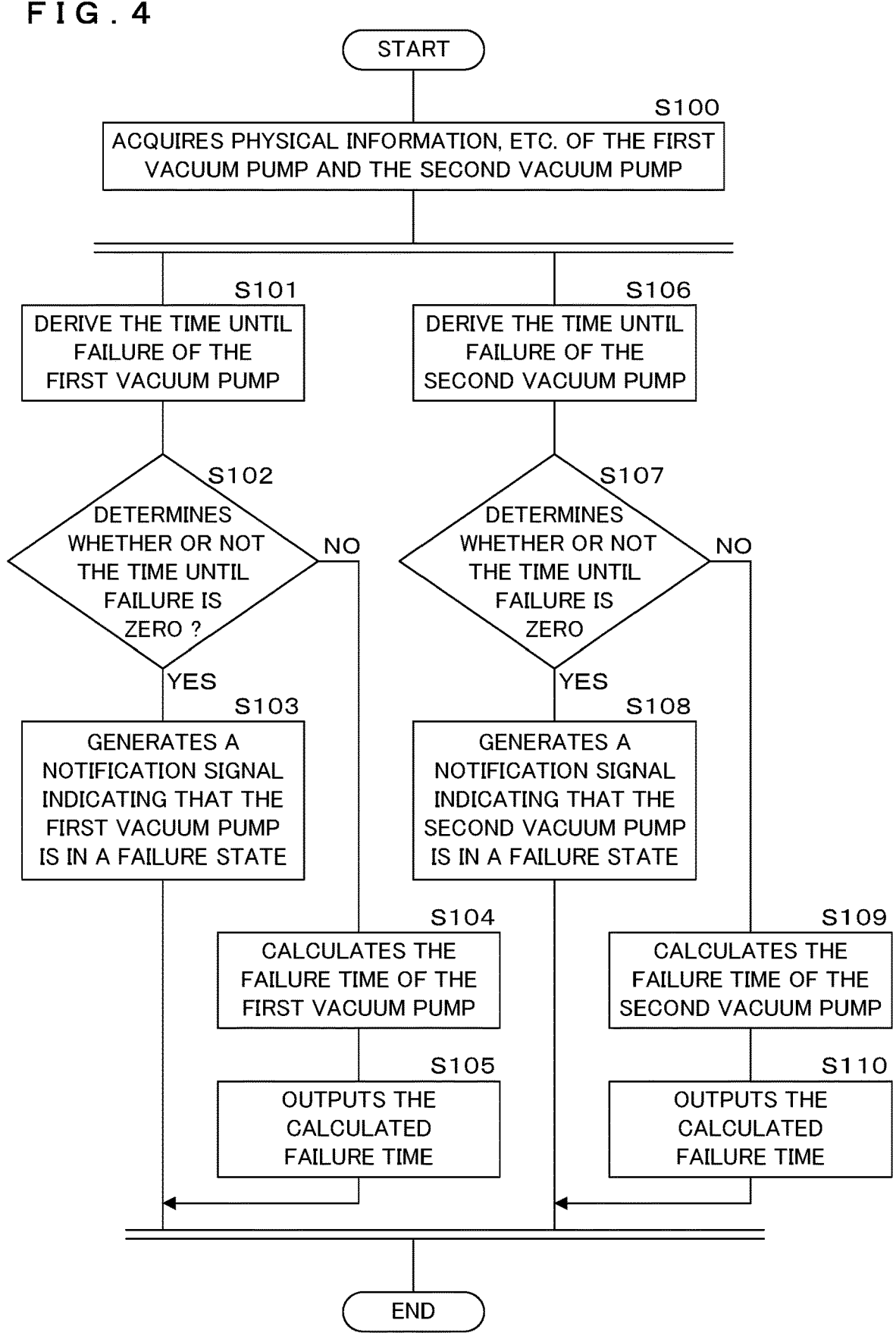
FIG. 4 is a flowchart illustrating an example of a processing procedure by a control unit.

FIG. 4 is a flowchart illustrating an example of a processing procedure by the control unit 91. The control unit 91 of the control device 9 included in the laser annealing apparatus 1 receives an operation of an operator by, for example, a keyboard connected to input and output, and performs the following processing based on the received operation.

The control unit 91 of the control device 9 acquires physical information, etc. of the first vacuum pump 101 and the second vacuum pump 102 (S100). The control unit 91 of the control device 9 acquires the physical quantities such as the temperature and the number of vibrations output from the temperature sensor 111 and the vibration sensor 112 provided to the first vacuum pump 101 and the second vacuum pump 102, respectively, when the first vacuum pump 101 and the second vacuum pump 102 perform evacuation.

The control unit 91 of the control device 9 generates temperature data and number-of-vibrations data of each of the first vacuum pump 101 and the second vacuum pump 102 based on the acquired temperature and number of vibrations. These temperature data and number-of-vibrations data may be data in array format, etc. based on a plurality of temperatures and numbers of vibrations acquired in time series, or an average value or a maximum value of a plurality of numbers of vibrations and temperatures acquired during an evacuation period.

The control unit 91 of the control device 9 derives, as a vacuum reach time, an elapsed time from when suction (evacuation) of gas in the chambers of the first vacuum pump 101 and the second vacuum pump 102 starts until a vacuum state is reached based on a pressure output from the pressure sensor 113. The control unit 91 of the control device 9 refers to the storage unit 92 and adds vacuum reach times of the first vacuum pump 101 and the second vacuum pump 102 up to a present time, thereby calculating each integrated operating time. By performing these processes, the control unit 91 of the control device 9 acquires the temperature data, the number-of-vibrations data, the vacuum reach time, and the integrated operating time of each of the first vacuum pump 101 and the second vacuum pump 102.

The control unit 91 of the control device 9 inputs physical information of the first vacuum pump 101, etc. to the learning model 921 for the vacuum pump to derive the time until failure of the first vacuum pump 101 (S101). The control unit 91 of the control device 9 inputs the temperature data, the number-of-vibrations data, the vacuum reach time, and integrated operating time of the first vacuum pump 101 to the learning model 921 for the vacuum pump, and acquire the time until failure output by the learning model 921 for the vacuum pump.

The control unit 91 of the control device 9 determines whether or not the time until failure is zero (S102). As described above, since the learning model 921 for the vacuum pump is trained by training data including the physical quantity at the time of failure, the case where a value output from the learning model 921 for the vacuum pump is 0 (time until failure is 0) means the first vacuum pump 101 is presumed to fail. The control unit 91 of the control device 9 determines whether or not the value output by the learning model 921 for the vacuum pump is 0 (time until failure is 0).

When the time until failure is 0 (S102: YES), the control unit 91 of the control device 9 generates a notification signal indicating that the first vacuum pump 101 is in a failure state (S103). When the time until failure is 0, the control unit 91 of the control device 9 determines that the first vacuum pump 101 fails, generates a notification signal indicating that the first vacuum pump 101 is in a failure state, and outputs the notification signal to the display device 941, etc.

When the time until failure is not 0 (S102: NO), the control unit 91 of the control device 9 calculates the failure time of the first vacuum pump 101 based on the time until failure (S104). When the time until failure is not 0, the control unit 91 of the control device 9 determines that the first vacuum pump 101 is normal, and adds the time until failure output by the learning model 921 for the vacuum pump, the planned outage period, etc. to the current date and time, thereby deriving an expected failure time.

The control unit 91 of the control device 9 outputs the calculated failure time (S105). The control unit 91 of the control device 9 outputs (transmits) the failure time to a mobile terminal of an administrator, etc. of the laser annealing apparatus 1 via, for example, the display device 941 or the communication unit 93.

The control unit 91 of the control device 9 derives the time until failure by inputting the physical information of the second vacuum pump 102, etc. to the learning model 921 for the vacuum pump (S106).

The control unit 91 of the control device 9 determines whether or not the time until failure is 0 (S107).

When the time until failure is 0 (S107: YES), the control unit 91 of the control device 9 generates a notification signal indicating that the second vacuum pump 102 is in a failure state (S108).

When the time until failure is not 0 (S107: NO), the control unit 91 of the control device 9 calculates the failure time of the second vacuum pump 102 based on the time until failure (S109).

The control unit 91 of the control device 9 outputs the calculated failure time (S110). The control unit 91 of the control device 9 performs the processing (S106 to S110) related to the second vacuum pump 102 similarly to the processing (S101 to S105) related to the first vacuum pump 101 using temperature data, number-of-vibrations data, a vacuum reach time, and an integrated operating time of the second vacuum pump 102.

The control unit 91 of the control device 9 may use, for example, multiple threads or multiple processes based on a plurality of sub-processes to perform the processing (S101 to S105) related to the first vacuum pump 101 and the processing (S106 to S110) related to the second vacuum pump 102 in parallel (parallel processing).

According to the present embodiment, the control unit 91 (failure prediction unit) of the control device 9 included in the laser annealing apparatus 1 (laser irradiation apparatus) acquires vibration generated when the vacuum pump (first vacuum pump 101 and second vacuum pump 102) is movable and the physical quantity (measured value) such as the temperature of the vacuum pump from the temperature sensor 111 and the vibration sensor 112 provided in the vacuum pump. Since the control device 9 derives a failure time of the vacuum pump based on physical quantities such as vibration and temperature of the vacuum pump, it is possible to efficiently predict failure of parts included in the laser annealing apparatus 1. The control device 9 can output the failure time to, for example, the display device 941 to urge the administrator of the laser annealing apparatus 1 to perform maintenance at an appropriate time, and suppress (reduce) downtime (operation outage period) of the laser annealing apparatus 1.

According to the present embodiment, since the failure time of the vacuum pump is derived based not only on the physical quantities such as the vibration and the temperature when the vacuum pump is movable but also information obtained by combining the physical quantities with a vacuum reach time from when the vacuum pump starts to inhale gas until the inside of the chamber is in the vacuum state, the estimation accuracy of the failure time can be improved.

According to the present embodiment, by using a learning model that outputs a time until failure of the vacuum pump in the case of inputting the physical quantities such as the vibration and the temperature when the vacuum pump is movable, the vacuum reach time, and the integrated movable time of the vacuum pump up to the present time, it is possible to efficiently derive (acquire) the time until failure. The control device 9 (failure prediction unit) can efficiently calculate the vacuum pump failure time by adding the time until failure, the planned outage period, etc. to the date and time when the vacuum pump is movable.

According to the present embodiment, the control device 9 (failure prediction unit) derives the failure time of each of the plurality of vacuum pumps (first vacuum pump 101 and second vacuum pump 102) based on each of the physical quantity and the vacuum reach time of each vacuum pump (first vacuum pump 101 and second vacuum pump 102) corresponding to each of the plurality of laser light sources 2 (first laser light source 21 and second laser light source 22). In this way, even when the laser irradiation apparatus includes the plurality of laser light sources 2 and vacuum pumps, it is possible to individually derive the failure time of these vacuum pumps (first vacuum pump 101 and second vacuum pump 102).

Second Embodiment

Figure 5:
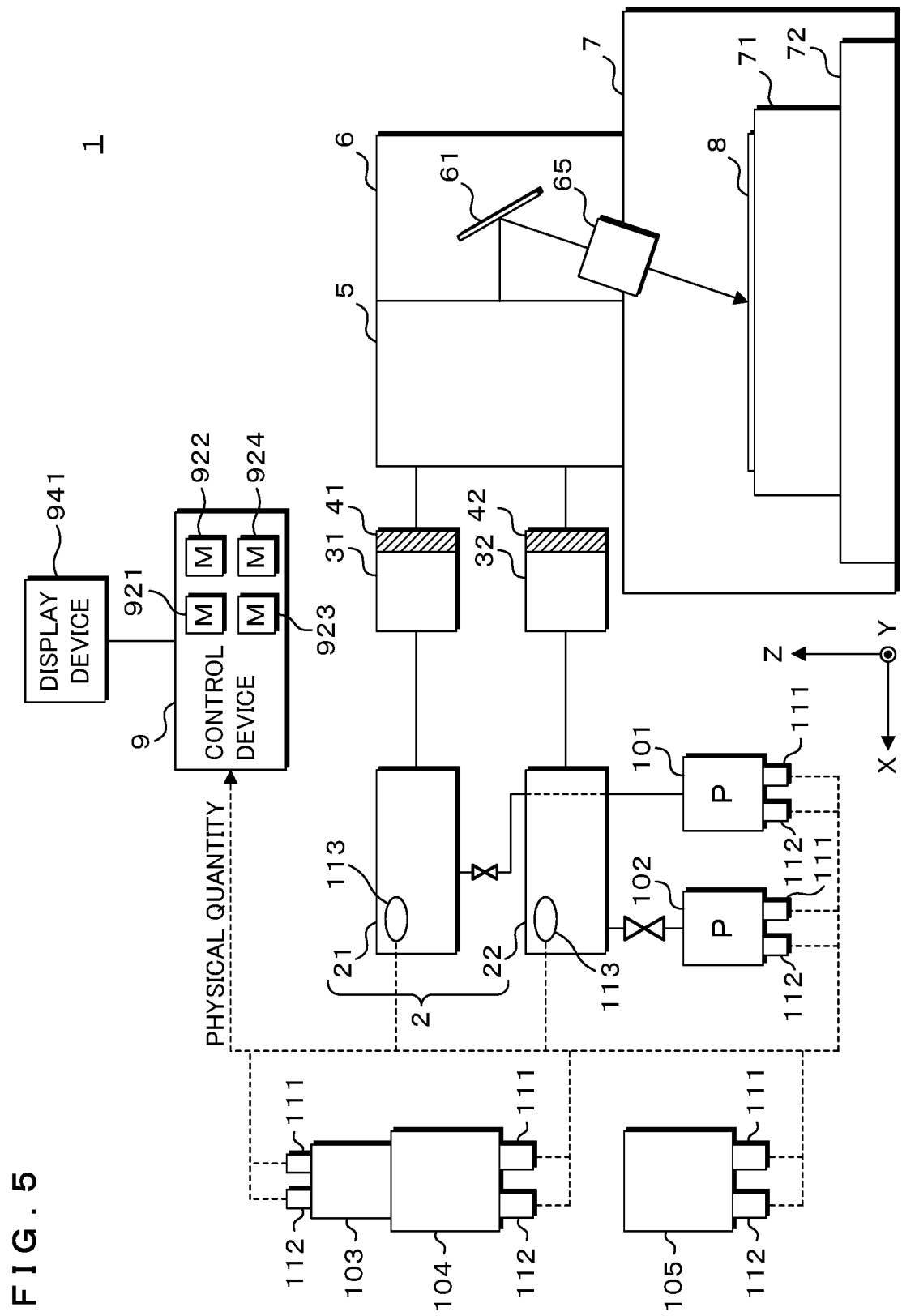
FIG. 5 is a diagram illustrating a configuration example of a laser annealing apparatus according to a second embodiment (various movable parts)

FIG. 5 is a diagram illustrating a configuration example of a laser annealing apparatus 1 according to a second embodiment (various movable parts). The laser annealing apparatus 1 according to the second embodiment includes a cold head 103, a He compressor 104, and a diaphragm pump 105 in addition to the first vacuum pump 101 and the second vacuum pump 102 as movable parts. Note that similarly to the first vacuum pump 101 and the second vacuum pump 102, the cold head 103, etc. may include a separate cold head 103 (first cold head and second cold head) corresponding to each of the first laser light source 21 and the second laser light source 22.

The laser annealing apparatus 1 is provided with a refrigerator that evacuates and cools a filter for removing impurities of gas inhaled from a chamber, and the refrigerator includes the cold head 103 and the He compressor 104 as movable parts. The cold head 103 includes a cylinder, a displacer that reciprocates in the cylinder to expand a refrigerant gas such as helium to generate cold heat, and a cold heat transfer member provided at a tip of the cylinder to transfer the generated cold heat to an object to be cooled. The He compressor 104 is a compressor that compresses helium (He), which is a refrigerant gas, and supplies the compressed helium to the cold head 103. The diaphragm pump 105 circulates a laser gas (a gas such as xenon enclosed in a chamber) to the refrigerator including the cold head 103, etc.

The cold head 103, the He compressor 104, and the diaphragm pump 105, which are these movable parts, are provided with the temperature sensor 111 and the vibration sensor 112 similarly to the first vacuum pump 101, etc. The temperature sensor 111 and the vibration sensor 112 provided to each of the cold head 103, the He compressor 104, and the diaphragm pump 105 is communicably connected to the control device 9 by a communication line, etc. as in the first embodiment to output detected physical quantities such as a temperature and the number of vibrations to the control device 9.

The control unit 91 of the control device 9 stores the temperature and the number of vibrations acquired from the temperature sensor 111 and vibration sensor 112 provided to each of the cold head 103, the He compressor 104, and the diaphragm pump 105 in the storage unit 92 in table format, for example, similarly to the temperature and the number of vibrations of the first vacuum pump 101, etc. of the first embodiment. Similarly to the integrated operating time of the first vacuum pump 101, etc. of the first embodiment, an integrated operating time of each of the cold head 103, the He compressor 104, and the diaphragm pump 105 is stored in the storage unit 92 of the control device 9.

The control unit 91 of the control device 9 acquires the temperature and the number of vibrations detected by the temperature sensor 111 and the vibration sensor 112, respectively, or refers to the temperature, the number of vibrations, and the integrated operating time stored in the storage unit 92. In this way, the control unit 91 of the control device 9 can acquire the temperature, the number of vibrations, and integrated operating time when the cold head 103, the He compressor 104, and the diaphragm pump 105 are movable.

Actual files of a learning model 922 for the cold head, a learning model 923 for the He compressor, and a learning model 924 for the diaphragm pump in addition to the learning model 921 for the vacuum pump are stored in the storage unit 92 of the control device 9 of the second embodiment. Similarly to the learning model 921 for the vacuum pump of the first embodiment, each of the learning model 922 for the cold head, the learning model 923 for the He compressor, and the learning model 924 for the diaphragm pump includes a DNN, etc.

The learning model 922 for the cold head outputs a time until failure of the cold head 103 when physical quantities such as vibration and a temperature and an integrated movable time of the cold head 103 are input. By using the learning model 922 for the cold head, the control unit 91 of the control device 9 can determine failure of the cold head 103 and derive the time until failure.

The learning model 923 for the He compressor outputs a time until failure of the He compressor 104 when physical quantities such as vibration and a temperature and an integrated movable time of the He compressor 104 are input. By using the learning model 923 for the He compressor, the control unit 91 of the control device 9 can determine failure of the He compressor 104 and derive the time until failure.

The learning model 924 for the diaphragm pump outputs a time until failure of the diaphragm pump 105 when physical quantities such as vibration and a temperature and an integrated movable time of the diaphragm pump 105 are input. By using the learning model 924 for the diaphragm pump, the control unit 91 of the control device 9 can determine failure of the diaphragm pump 105 and derive the time until failure.

Figure 6:
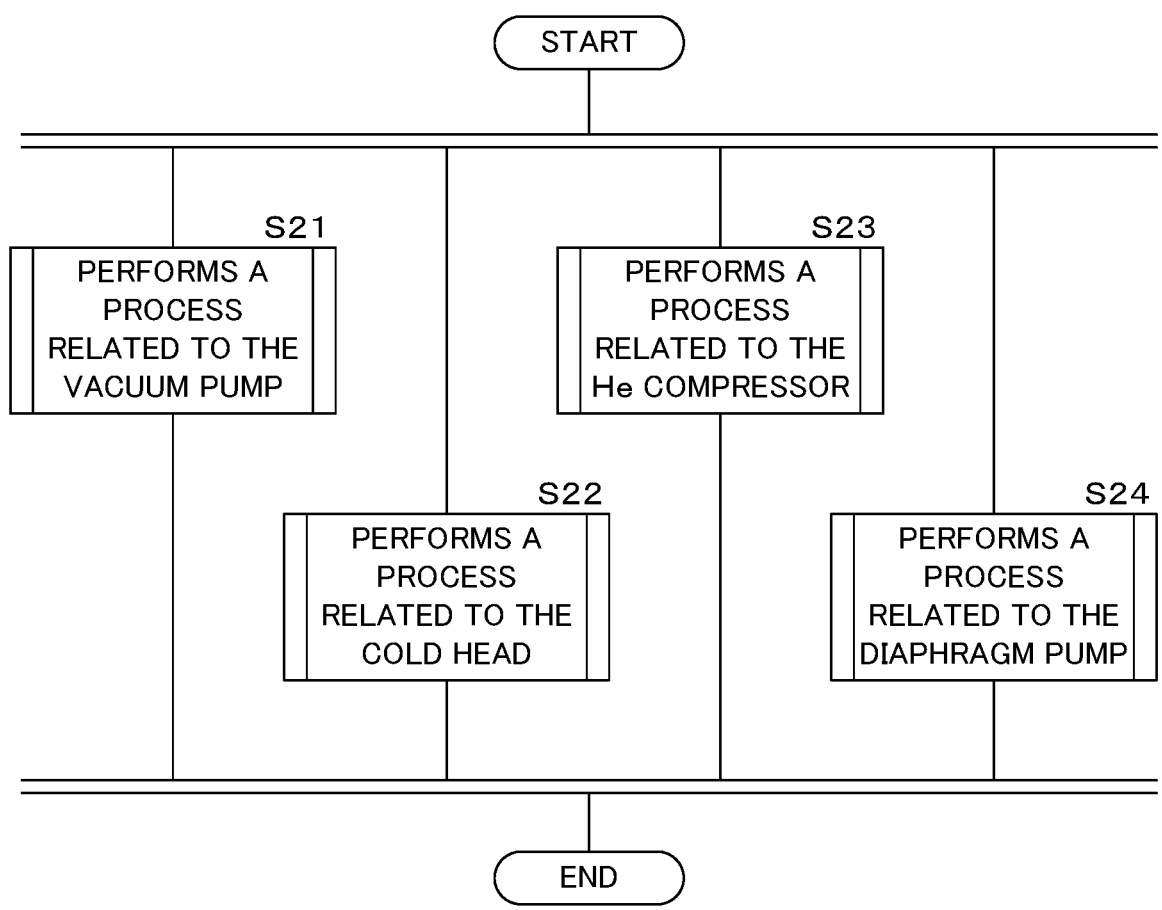
FIG. 6 is a flowchart illustrating an example of a processing procedure by a control unit.
Figure 7:
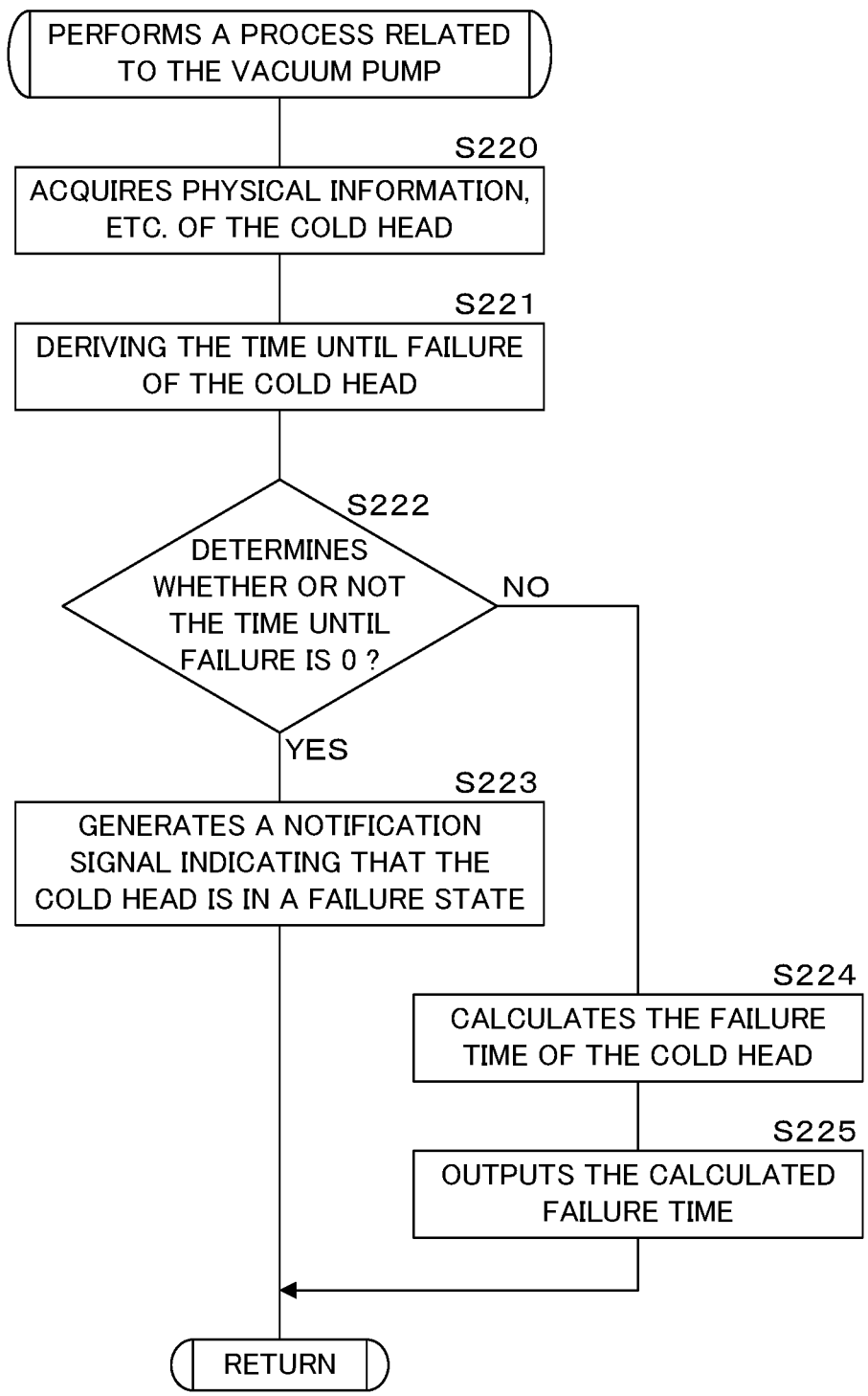
FIG. 7 is a flowchart illustrating an example of a processing procedure (cold head) by the control unit.
Figure 8:
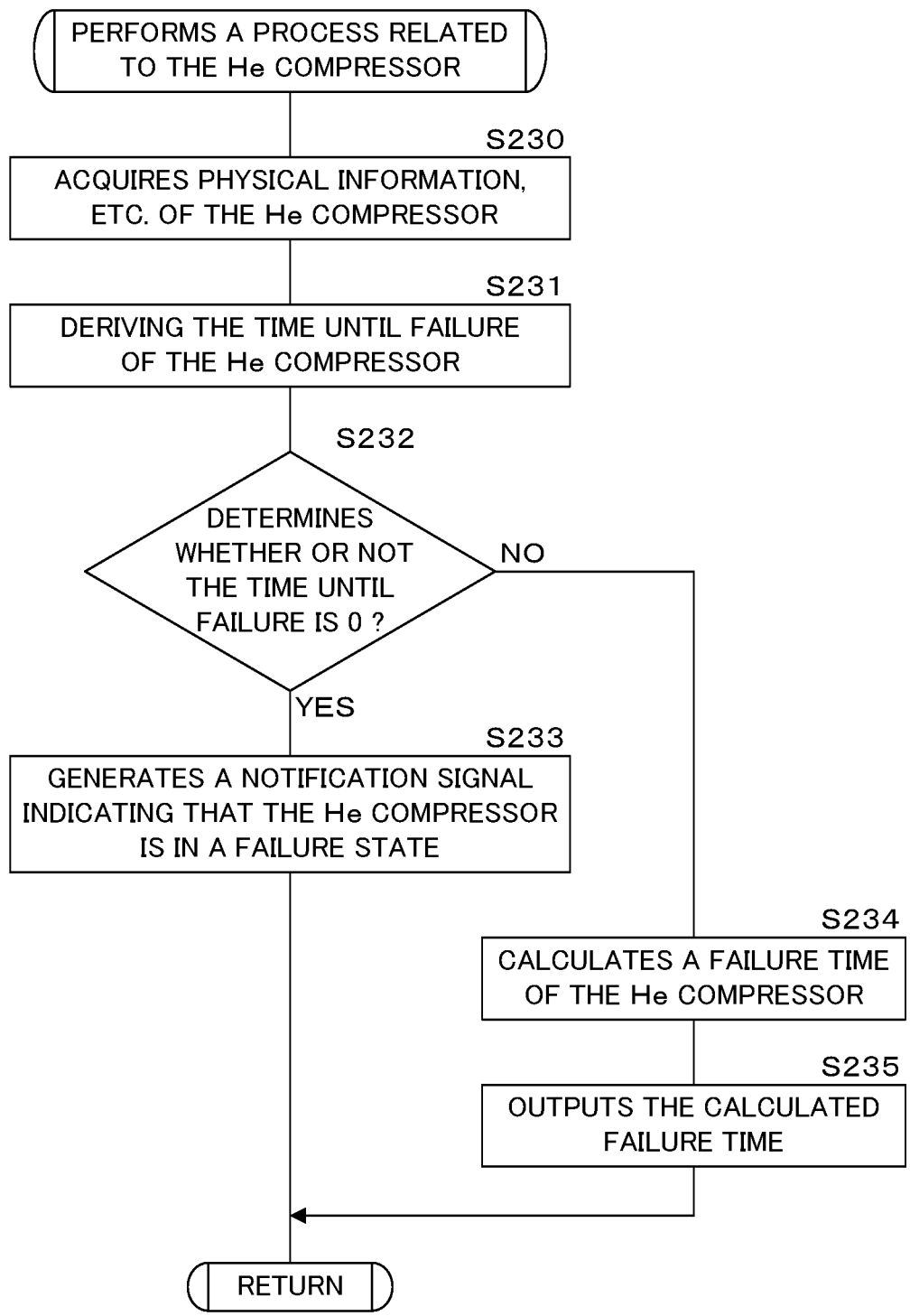
FIG. 8 is a flowchart illustrating an example of a processing procedure (He compressor) by the control unit.
Figure 9:
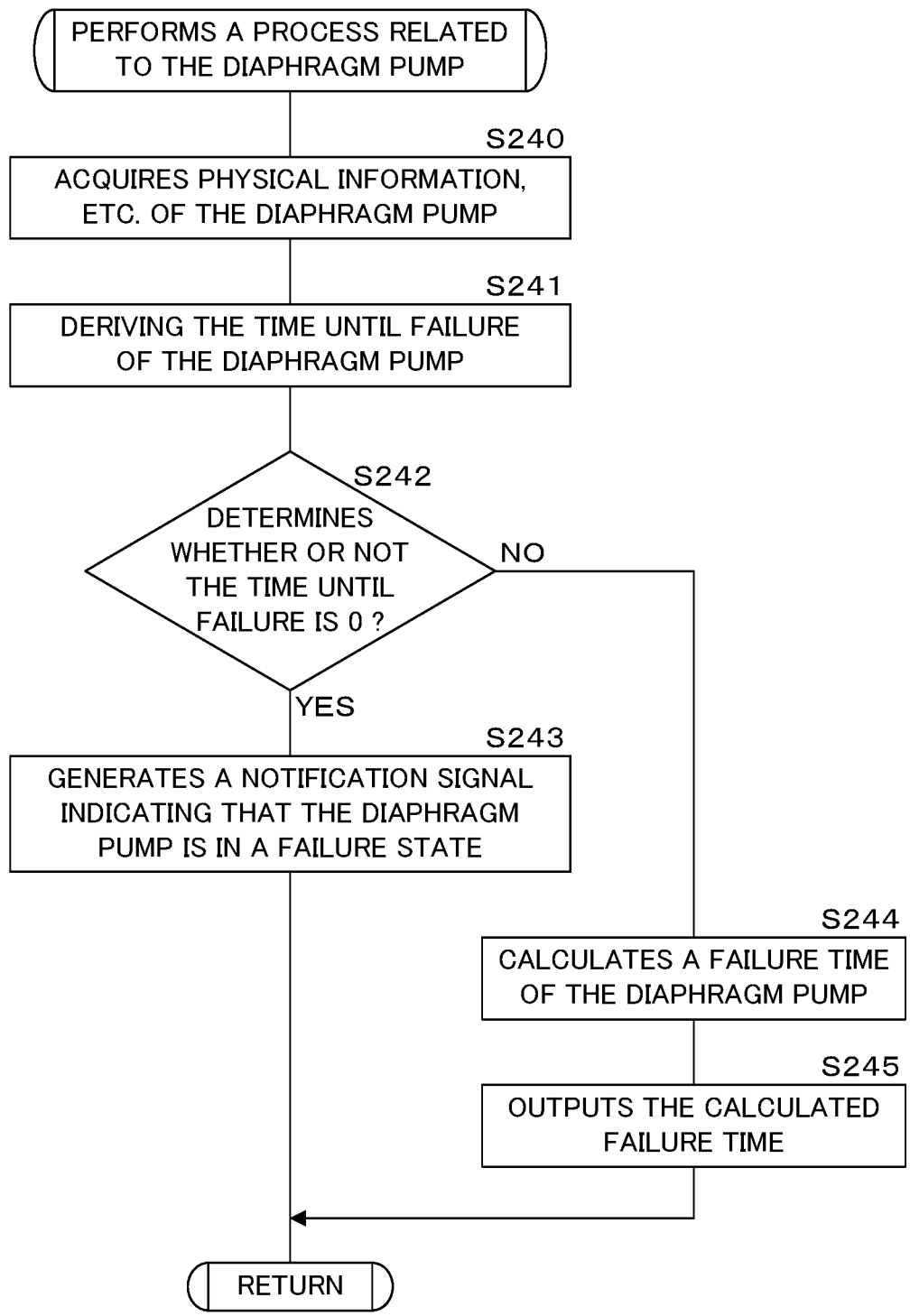
FIG. 9 is a flowchart illustrating an example of a processing procedure (diaphragm pump) by the control unit.

FIG. 6 is a flowchart illustrating an example of a processing procedure by the control unit 91. FIG. 7 is a flowchart illustrating an example of a processing procedure (cold head 103) by the control unit 91. FIG. 8 is a flowchart illustrating an example of a processing procedure (He compressor 104) by the control unit 91. FIG. 9 is a flowchart illustrating an example of a processing procedure (diaphragm pump 105) by the control unit 91. The control unit 91 of the control device 9 included in the laser annealing apparatus 1 receives an operation of an operator by, for example, a keyboard connected to input/output, and performs the following processing based on the received operation.

The control unit 91 of the control device 9 performs a process related to the vacuum pump (S21). The process related to the vacuum pump is performed, for example, as a process made into a subroutine by the flow illustrated in FIG. 4 as in the first embodiment. The control unit 91 of the control device 9 performs similar processing to a series of processing (S100 to S110) described in the first embodiment with regard to the process related to the vacuum pump.

The control unit 91 of the control device 9 performs a process related to the cold head 103 (S22). The process related to the cold head 103 is performed by the following flow illustrated in FIG. 7, for example, as a process made into a subroutine.

The control unit 91 of the control device 9 acquires physical information, etc. of the cold head 103 (S220). The control unit 91 of the control device 9 acquires the temperature and the number of vibrations detected by the temperature sensor 111 and the vibration sensor 112 of the cold head 103, or acquires the temperature, the number of vibrations, and the integrated operating time when the cold head 103 is movable by referring to the storage unit 92.

The control unit 91 of the control device 9 inputs physical information of the cold head 103, etc. to the learning model 922 for the cold head, thereby deriving the time until failure of the cold head 103 (S221). The control unit 91 of the control device 9 inputs the acquired temperature, number of vibrations, and integrated operating time of the cold head 103 to the learning model 922 for the cold head to derive the time until failure of the cold head 103.

The control unit 91 of the control device 9 determines whether or not the time until failure is 0 (S222). When the time until failure is 0 (S222: YES), the control unit 91 of the control device 9 generates a notification signal indicating that the cold head 103 is in a failure state (S223). When a value output by the learning model 922 for the cold head is 0, the control unit 91 of the control device 9 determines that the cold head 103 fails, generates a notification signal indicating that the cold head 103 is in a failure state, and outputs the notification signal to the display device 941, etc.

When the time until failure is not 0 (S222: NO), the control unit 91 of the control device 9 calculates the failure time of the cold head 103 based on the time until failure (S224). The control unit 91 of the control device 9 outputs the calculated failure time (S225). When the time until failure is not 0, the control unit 91 of the control device 9 determines that the cold head 103 is normal, adds the time until failure output by the learning model 922 for the cold head, a planned outrage period, etc. to a data and time at a present time (when the cold head 103 is movable) to derive an expected failure time, and outputs the expected failure time to the display device 941, etc.

The control unit 91 of the control device 9 performs a process related to the He compressor 104 (S23). The process related to the He compressor 104 is performed by the following flow illustrated in FIG. 8, for example, as a process made into a subroutine.

The control unit 91 of the control device 9 acquires physical information, etc. of the He compressor 104 (S230). The control unit 91 of the control device 9 acquires the temperature and the number of vibrations detected by the temperature sensor 111 and the vibration sensor 112 of the He compressor 104, or acquires the temperature, the number of vibrations, and the integrated operating time when the He compressor 104 is movable by referring to the storage unit 92.

The control unit 91 of the control device 9 inputs the physical information of the He compressor 104, etc. to the learning model 923 for the He compressor, thereby deriving the time until failure of the He compressor 104 (S231). The control unit 91 of the control device 9 inputs the acquired temperature, number of vibrations, and integrated operating time of the He compressor 104 to the learning model 923 for the He compressor, and derives the time until failure of the He compressor 104.

The control unit 91 of the control device 9 determines whether or not the time until failure is 0 (S232). When the time until failure is 0 (S232: YES), the control unit 91 of the control device 9 generates a notification signal indicating that the He compressor 104 is in a failure state (S233). When a value output by the learning model 923 for the He compressor is 0, the control unit 91 of the control device 9 determines that the He compressor 104 fails, generates a notification signal indicating that the He compressor 104 is in a failure state, and outputs the notification signal to the display device 941, etc.

When the time until failure is not 0 (S232: NO), the control unit 91 of the control device 9 calculates a failure time of the He compressor 104 based on the time until failure (S234). The control unit 91 of the control device 9 outputs the calculated failure time (S235). When the time until failure is not 0, the control unit 91 of the control device 9 determines that the He compressor 104 is normal, adds the time until failure output by the learning model 923 for the He compressor, a planned outrage period, etc. to a data and time at a present time (when the He compressor 104 is movable) to derive an expected failure time, and outputs the expected failure time to the display device 941, etc.

The control unit 91 of the control device 9 performs a process related to the diaphragm pump 105 (S24). The process related to the diaphragm pump 105 is performed by the following flow illustrated in FIG. 9, for example, as a process made into a subroutine.

The control unit 91 of the control device 9 acquires physical information, etc. of the diaphragm pump 105 (S240). The control unit 91 of the control device 9 acquires the temperature and the number of vibrations detected by the temperature sensor 111 and the vibration sensor 112 of the diaphragm pump 105, or acquires the temperature, the number of vibrations, and the integrated operating time when the diaphragm pump 105 is movable by referring to the storage unit 92.

The control unit 91 of the control device 9 inputs the physical information of the diaphragm pump 105, etc. to the learning model 924 for the diaphragm pump, thereby deriving the time until failure of the diaphragm pump 105 (S241). The control unit 91 of the control device 9 inputs the acquired temperature, number of vibrations, and integrated operating time of the diaphragm pump 105 to the learning model 924 for the diaphragm pump, and derives the time until failure of the diaphragm pump 105.

The control unit 91 of the control device 9 determines whether or not the time until failure is 0 (S242). When the time until failure is 0 (S242: YES), the control unit 91 of the control device 9 generates a notification signal indicating that the diaphragm pump 105 is in a failure state (S243). When a value output by the learning model 924 for the diaphragm pump is 0, the control unit 91 of the control device 9 determines that the diaphragm pump 105 fails, generates a notification signal indicating that the diaphragm pump 105 is in a failure state, and outputs the notification signal to the display device 941, etc.

When the time until failure is not 0 (S242: NO), the control unit 91 of the control device 9 calculates a failure time of the diaphragm pump 105 based on the time until failure (S244). The control unit 91 of the control device 9 outputs the calculated failure time (S245). When the time until failure is not 0, the control unit 91 of the control device 9 determines that the diaphragm pump 105 is normal, adds the time until failure output by the learning model 924 for the diaphragm pump, a planned outrage period, etc. to a data and time at a present time (when the diaphragm pump 105 is movable) to derive an expected failure time, and outputs the expected failure time to the display device 941, etc.

According to the present embodiment, since the movable part includes at least one of the vacuum pump, the diaphragm pump 105, the helium compressor, and the cold head 103, it is possible to efficiently predict individual failures of these various movable parts. The control unit 91 of the control device 9 may perform each processing from S21 to S24 corresponding to each drive component in parallel by a multi-process, etc. A processing time can be shortened by performing processes related to derivation of the time until failure for each of a plurality of movable parts included in the laser annealing apparatus 1 in parallel.

Third Embodiment

Figure 10:
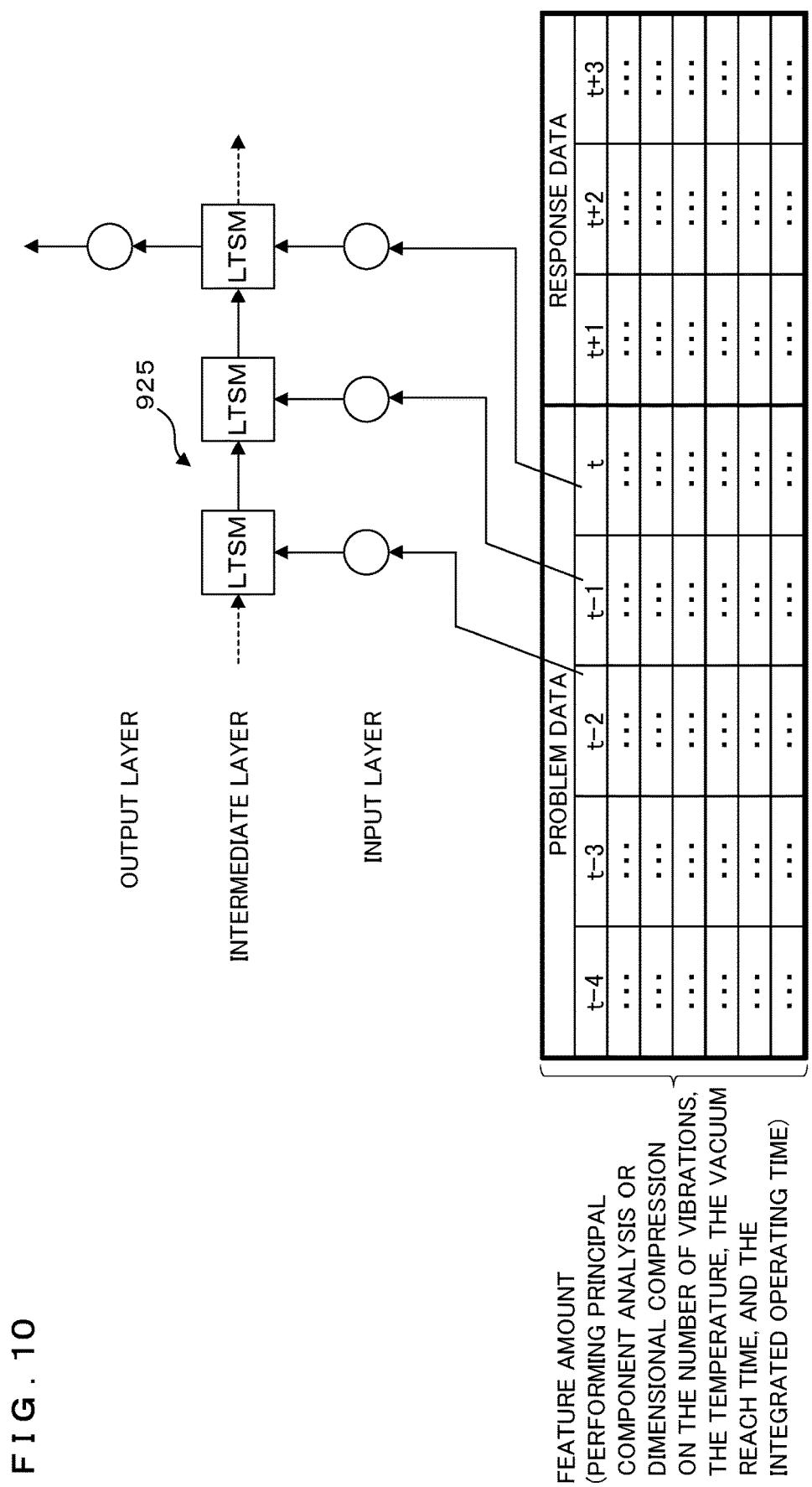
FIG. 10 is an explanatory diagram illustrating an example of a feature amount learning model according to a third embodiment (feature amount learning model)

FIG. 10 is an explanatory diagram illustrating an example of a feature amount learning model 925 according to a third embodiment (feature amount learning model 925). The control unit 91 (failure prediction unit) of the control device 9 of the third embodiment inputs a feature amount derived from the number of vibrations, a temperature, a vacuum reach time, and an integrated operating time of a movable part such as the first vacuum pump 101 to the feature amount learning model 925. The control unit 91 of the control device 9 derives the feature amount by performing, for example, principal component analysis or dimensional compression on the number of vibrations, the temperature, the vacuum reach time, and the integrated operating time.

The feature amount learning model 925 estimates (outputs) a feature amount subsequent to the input feature amount (feature amount at a subsequent point) based on the input feature amount. That is, by using the feature amount learning model 925, it is possible to derive (estimate) a subsequent (future) feature amount based on a plurality of feature amounts in a time series from the past to the present time. The control unit 91 (failure prediction unit) of the control device 9 may compare a value of a future feature amount estimated (output) by the feature amount learning model 925 with a predetermined threshold value (value of the feature amount leading to failure), thereby deriving a time until failure of the movable part such as the first vacuum pump 101.

The control unit 91 of the control device 9 learns based on training data, in which a plurality of time-series features amounts is used as problem data and feature amounts at a plurality of time points in the future are used as response data, thereby constructing (generating) a neural network (feature amount learning model 925) to which a plurality of time-series features amounts is input and from which feature amounts at a plurality of time points in the future are output.

An input layer of the feature amount learning model 925 has a single or a plurality of neurons that receives a plurality of time-series feature amounts and passes each of the input feature amounts to an intermediate layer. The intermediate layer includes an autoregressive layer containing a plurality of neurons. The autoregressive layer is implemented as, for example, an LSTM (Long Short Term Memory) model, and a neural network including such an autoregressive layer is referred to as an RNN (recurrent neural network). The intermediate layer outputs the amount of change due to each of the plurality of feature amounts sequentially input in time series. An output layer has one or a plurality of neurons that outputs feature amounts at a plurality of time points in the future, and outputs feature amounts at a plurality of time points in the future based on the amount of change due to each of a plurality of feature amounts output from the intermediate layer. Such learning for RNN is performed using, for example, a BPTT (Backpropagation Through Time) algorithm.

The training data may be stored in an array format. When the training data is in an array format, for example, a value of each of elements of sequence numbers 0 to 4 (t−4 to t) may be used as problem data, and a value of each of elements of sequence numbers 5 to 7 (t+1 to t+3) may be used as response data. Time-series problem data (t−2, t−1, t) input from the input layer is sequentially passed to the LSTM (autoregressive layer), and the LSTM (autoregressive layer) can process sequence information containing a temporal change and order by outputting an output value to the output layer and a layer thereof.

In the present embodiment, the input and output of the feature amount learning model 925 are feature amounts obtained by performing principal component analysis on the number of vibrations, etc. However, the disclosure is not limited thereto. Each value of the number of vibrations, the temperature, the vacuum reach time, and the integrated operating time may be input to the feature amount learning model 925.

Figure 11:
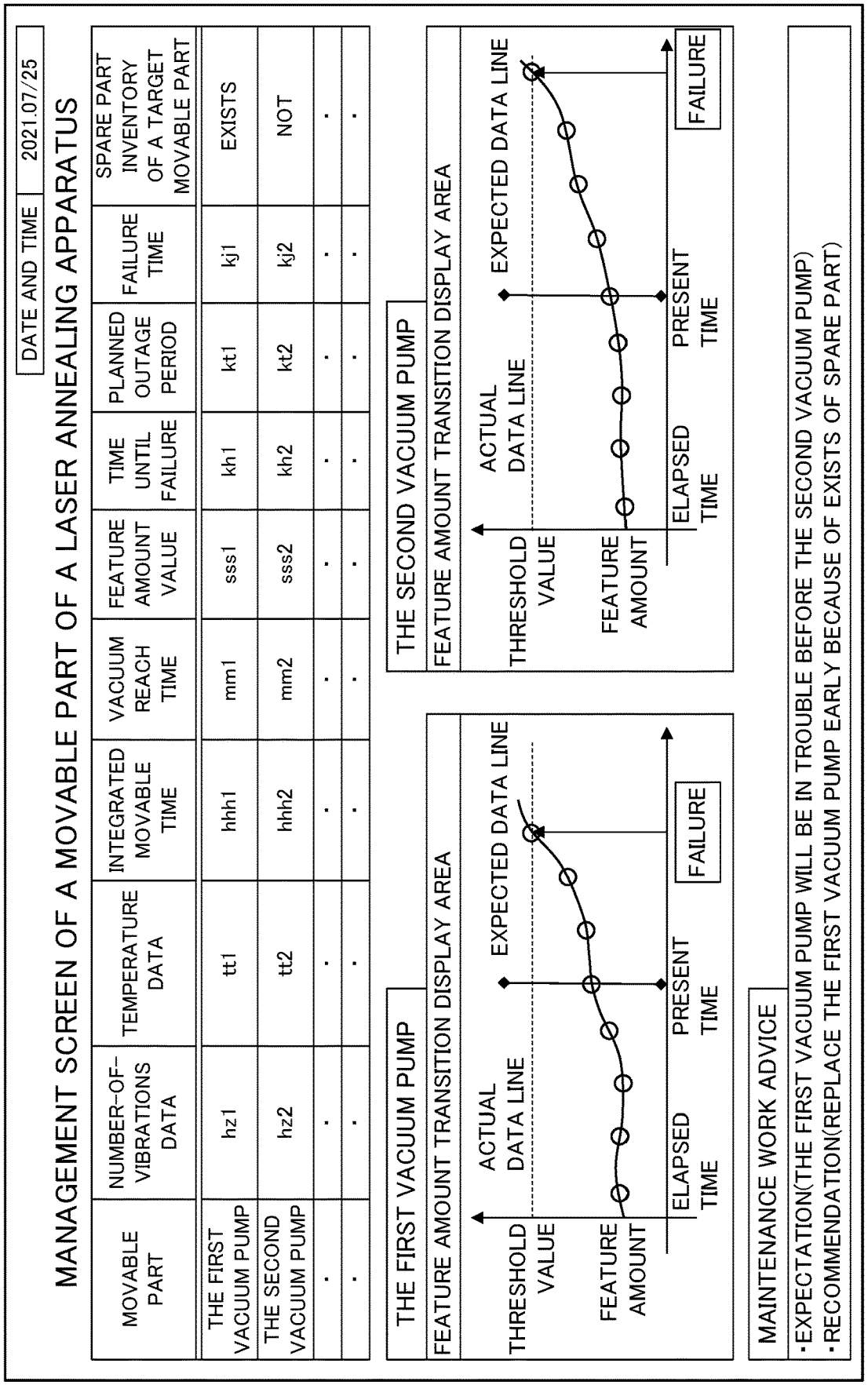
FIG. 11 is a diagram for description of an example of a management screen of a movable part.

FIG. 11 is a diagram for description of an example of a management screen of a movable part. The control unit 91 of the control device 9 acquires feature amounts at a plurality of time points in the future output from the feature amount learning model 925, uses the acquired feature amounts to generate a management screen (screen data) illustrated as an example in the present embodiment, and outputs the generated management screen to, for example, the display device 941, etc.

The management screen of the movable part contains a list display area that shows physical quantity of each movable part in a list format, a feature amount transition display area that displays transition of the feature amount in a graph format, and a maintenance work advice display area that displays advice related to maintenance work.

In the list display area, physical quantities such as vibration (number-of-vibrations data) and a temperature (temperature data), a vacuum reach time, an integrated movable time, a feature amount value, a time until failure, a planned outage period, a failure time and a spare part inventory of a target movable part (the first vacuum pump 101, the second vacuum pump 102, etc.) at a present time are displayed. The physical quantities such as the vibration (number-of-vibrations data) and the temperature (temperature data), the vacuum reach time, and the integrated movable time are displayed based on a detection result from a detection unit such as the temperature sensor 111 and an item stored in the storage unit 92 of the control device 9 as in the first embodiment. The feature amount value is a value of a feature amount derived by performing, for example, principal component analysis or dimensional compression on the number of vibrations, the temperature, the vacuum reach time, and the integrated operating time.

The time until failure is a time calculated by a difference between an elapsed time when a threshold value (value of the feature amount leading to failure) is reached and an elapsed time up to a present time among feature amounts at a plurality of times points in the future output from the feature amount learning model 925. The planned outage period is a period in which a target movable part is scheduled to be suspended in a planned manner based on an operation plan and a maintenance/inspection plan of the laser annealing apparatus 1. The failure time is a time obtained by adding the time until failure and the planned outage period to the current date and time and is a time when the failure of a target movable part is assumed.

In the feature amount transition display area, transition of the feature amount for each target movable part is displayed in a graph format. A vertical axis of the graph indicates a value of the feature amount. A horizontal axis indicates an elapsed time, that is, indicates a movable time of a movable part such as the first vacuum pump 101. As the movable time (integrated operating time/number of times of evacuation) increases, a value of the feature amount tends to increase. When the value of the feature amount reaches a threshold value (value of the feature amount leading to failure), it is expected that the movable part is likely to fail. A point (indicated by O) illustrated in the diagram indicates a derived feature amount. A length between two adjacent points (indicated by O) indicates one operation time in the movable part such as the first vacuum pump 101. An elapsed time indicated by the point is an integrated operating time when the feature amount is derived.

As described above, the control unit 91 of the control device 9 derives the feature amount by performing, for example, principal component analysis or dimensional compression on the number of vibrations, the temperature, the vacuum reach time, and the integrated operating time. By inputting a plurality of time-series feature amounts from the past to the present time to the feature amount learning model 925, it is possible to output one or more feature amounts (future feature amounts) which are subsequent points after a feature amount at the present point, that is, for a last feature amount among the input time-series feature amounts. Furthermore, by recursively inputting a plurality of time-series feature amounts including the output feature amount after the subsequent point to the feature amount learning model 925, it is possible to output (expect) a subsequent feature amount. In this way, it is possible to derive the time until failure by perceiving an increasing tendency of the feature amount and calculating a time until reaching a preset threshold value (value of the feature amount leading to failure) from a present time.

The threshold value may be dynamically changed by, for example, an operation by an administrator of the laser annealing apparatus 1. The control unit 91 of the control device 9 receives the change of the threshold value by the administrator, etc., and when the threshold value is changed, the control unit 91 recalculates the time until the failure based on the changed threshold value. The control unit 91 of the control device 9 calculates the failure time by adding the time until the failure to the current date and time. Alternatively, the control unit 91 of the control device 9 may calculate the failure time by adding the time until the failure and a planned suspension time to the current date and time.

In the maintenance work advice display area, generated advice text is displayed based on the time until failure of the target movable part or the failure time. The control unit 91 of the control device 9 may refer to a table in which, for example, a state (time until failure or failure time) and action (advice) stored in the storage unit 92 are associated, thereby generating advice on the time until failure of the movable part at the present time.

Other Embodiments

FIGS. 12, 13, 14, 15, and 16 are process sectional views illustrating a method of manufacturing a semiconductor device according to another embodiment (method of manufacturing a semiconductor device). As another embodiment, a description will be given of a method of manufacturing a semiconductor device using the laser annealing apparatus 1 according to the embodiment. In the method of manufacturing the semiconductor device below, an annealing process using the laser annealing apparatus 1 according to the first to fourth embodiments is performed in a process of crystallizing an amorphous semiconductor film.

The semiconductor device is a semiconductor device including a TFT (Thin Film Transistor), and in this case, an amorphous silicon film 84 can be crystallized by being irradiated with laser light to form a polysilicon film 85. The polysilicon film 85 is used as a semiconductor layer having a source region, a channel region, and a drain region of the TFT.

The laser annealing apparatus 1 according to the embodiment described above is suitable for manufacturing a TFT array substrate. Hereinafter, a method of manufacturing the semiconductor device having the TFT will be described.

First, as illustrated in FIG. 12, a gate electrode 82 is formed on a glass substrate 81 (substrate 8). As the gate electrode 82, for example, it is possible to use a metal thin film containing aluminum, etc. Subsequently, as illustrated in FIG. 13, a gate insulating film 83 is formed on the gate electrode 82. The gate insulating film 83 is formed so as to cover the gate electrode 82. Thereafter, as illustrated in FIG. 14, the amorphous silicon film 84 is formed on the gate insulating film 83. The amorphous silicon film 84 is disposed to overlap with the gate electrode 82 via the gate insulating film 83.

The gate insulating film 83 is a silicon nitride film (SiNx), a silicon oxide film ($SiO_2$ film), a laminated film thereof, etc. Specifically, the gate insulating film 83 and the amorphous silicon film 84 are continuously formed by a CVD (Chemical Vapor Deposition) method. The glass substrate 81 having the amorphous silicon film 84 serves as the semiconductor film in the laser annealing apparatus 1 (laser irradiation apparatus).

Figure 15:
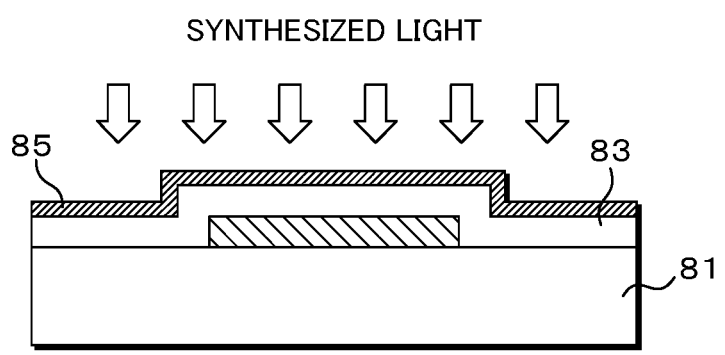
FIG. 15 is a process sectional view illustrating the method of manufacturing the semiconductor device according to another embodiment (method of manufacturing the semiconductor device)

Then, as illustrated in FIG. 15, the amorphous silicon film 84 is crystallized by being irradiated with laser light L3 using the laser annealing apparatus 1 described above, thereby forming the polysilicon film 85. In this way, the polysilicon film 85 in which silicon is crystallized is formed on the gate insulating film 83.

Figure 16:
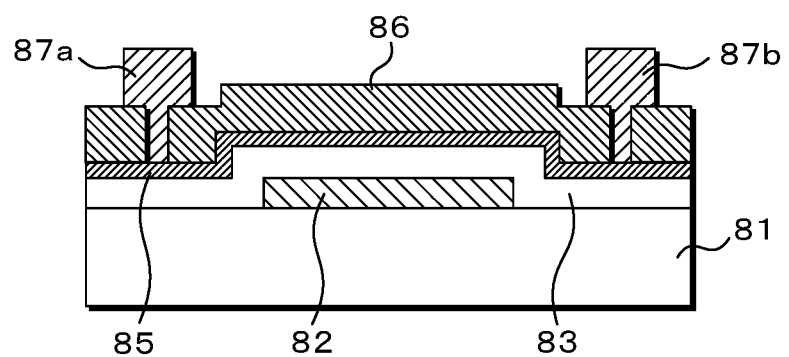
FIG. 16 is a process sectional view illustrating the method of manufacturing the semiconductor device according to another embodiment (method of manufacturing the semiconductor device).

Thereafter, as illustrated in FIG. 16, an interlayer insulating film 86, a source electrode 87*a*, and a drain electrode 87*b* are formed on the polysilicon film 85. The interlayer insulating film 86, the source electrode 87*a*, and the drain electrode 87*b* can be formed using a general photolithography method or a film forming method. A subsequent manufacturing process differs depending on the device to be finally manufactured, and thus a description thereof will be omitted.

By using the method of manufacturing the semiconductor device described above, it is possible to manufacture a semiconductor device including a TFT including a polycrystalline semiconductor film. Such a semiconductor device is suitable for controlling a high-definition display such as an organic EL (Electro Luminescence) display. By suppressing unevenness of the polysilicon film 85 as described above, it is possible to manufacture a display device having excellent display characteristics with high productivity.

In performing these series of processing processes, a failure time of the movable part such as the vacuum pump included in the laser annealing apparatus 1 is predicted by the processes disclosed in the first embodiment, etc. based on the physical quantities, etc. acquired when the movable part is movable. Maintenance work such as inspection or replacement of these moving parts can be performed according to the predicted failure time, thereby reducing the downtime of the laser annealing apparatus 1 and improving the operating rate of the laser annealing apparatus 1.

Note that the present disclosure is not limited to the above embodiments, and can be appropriately modified without departing from the spirit. For example, the present disclosure is not limited to the example in which the amorphous silicon film 84 is irradiated with laser light to form the polysilicon film 85, and the amorphous silicon film 84 may be irradiated with laser light to form a microcrystal silicon film. Further, an amorphous film other than the silicon film may be irradiated with laser light to form a crystallized film.

The embodiments disclosed this time should be considered to be exemplary in all respects and not restrictive. Technical features described in each example can be combined with each other and the scope of the invention is intended to include all modifications within the scope of the claims and scope equivalent to the scope of the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims

What is claimed is:
1. A laser irradiation apparatus including a laser light source, the apparatus comprising:

a failure prediction unit configured to perform failure prediction on a movable part used when a substrate is processed by the laser light source, wherein the failure prediction unit acquires a physical quantity when the movable part is moving and acquires an integrated movable time of the movable part, wherein the integrated movable time comprises a total sum of time the movable part has been moving, and derives a failure time of the movable part based on the acquired physical quantity and the acquired integrated movable time;

wherein the movable part is a vacuum pump configured to inhale gas enclosed in a chamber of the laser light source, and the failure prediction unit acquires a vacuum reach time from when the vacuum pump starts to inhale gas until when an inside of the chamber is in a vacuum state, and derives a failure time of the vacuum pump based on an acquired physical quantity and a vacuum reach time.

2. The laser irradiation apparatus according to claim 1, wherein the movable part is provided with a detection unit configured to detect a physical quantity when the movable part is moving, the detection unit includes at least one of a temperature sensor and a vibration sensor, and the failure prediction unit acquires a physical quantity when the movable part is moving, from the detection unit.

3. The laser irradiation apparatus according to claim 1, wherein the failure prediction unit inputs an acquired physical quantity to a learning model for outputting a time until failure of the movable part in a case where a physical quantity when the movable part is movable is input, thereby deriving a failure time of the movable part.

4. The laser irradiation apparatus according to claim 1, wherein the laser irradiation apparatus includes a plurality of laser light sources and a plurality of vacuum pumps corresponding to the plurality of laser light sources, respectively, and the failure prediction unit acquires a physical quantity and a vacuum reach time of each of the plurality of vacuum pumps, and derives a failure time of each of the plurality of vacuum pumps based on each of acquired physical quantities and vacuum reach times.

5. The laser irradiation apparatus according to claim 1, wherein the moveable part includes at least one of a diaphragm pump, a helium compressor, and a cold head.

6. The laser irradiation apparatus according to claim 1, wherein the movable part is a vacuum pump configured to inhale gas enclosed in a chamber of the laser light source, and wherein the integrated movable time comprises a total sum of time the vacuum pump has inhaled gas enclosed in a chamber of the laser light source.

7. A laser irradiation apparatus including a laser light source, the apparatus comprising:

a failure prediction unit configured to perform failure prediction on a movable part used when a substrate is processed by the laser light source, wherein the movable part is a vacuum pump configured to inhale gas enclosed in a chamber of the laser light source, wherein the failure prediction unit acquires a physical quantity when the movable part is moving and acquires a vacuum reach time from when the vacuum pump starts to inhale gas until when an inside of the chamber is in a vacuum state, and derives a failure time of the movable part based on the acquired physical quantity and the vacuum reach time.

8. An information processing method of causing a computer configured to perform failure prediction on a movable part used when a substrate is processed by a laser light source included in a laser irradiation apparatus to execute processes of:

(A) acquiring a physical quantity when the movable part is movable, wherein the movable part is a vacuum pump configured to inhale gas enclosed in a chamber of the laser light source;

(B) acquiring a vacuum reach time from when the vacuum pump starts to inhale gas until when an inside of the chamber is in a vacuum state; and (C) deriving a failure time of the movable part based on the acquired physical quantity and the vacuum reach time.

9. A non-transitory recording medium recording a program to be readable, the program causing a computer configured to perform failure prediction on a movable part used when a substrate is processed by a laser light source included in a laser irradiation apparatus to execute processes of:

(A) acquiring a physical quantity when the movable part is movable, wherein the movable part is a vacuum pump configured to inhale gas enclosed in a chamber of the laser light source;

(B) acquiring a vacuum reach time from when the vacuum pump starts to inhale gas until when an inside of the chamber is in a vacuum state; and (C) deriving a failure time of the movable part based on the acquired physical quantity and the vacuum reach time.

* * * * *